United States Patent
Takano et al.

(10) Patent No.: US 10,942,434 B2
(45) Date of Patent: Mar. 9, 2021

(54) LIGHT SOURCE OPTICAL SYSTEM, LIGHT SOURCE DEVICE, AND IMAGE PROJECTION APPARATUS

(71) Applicants: Yohei Takano, Kanagawa (JP); Tatsuya Takahashi, Kanagawa (JP); Kasumi Nakamura, Kanagawa (JP)

(72) Inventors: Yohei Takano, Kanagawa (JP); Tatsuya Takahashi, Kanagawa (JP); Kasumi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/816,264

(22) Filed: Mar. 12, 2020

(65) Prior Publication Data
US 2020/0301260 A1    Sep. 24, 2020

(30) Foreign Application Priority Data
Mar. 18, 2019  (JP) ............................. JP2019-050033

(51) Int. Cl.
G03B 21/20    (2006.01)

(52) U.S. Cl.
CPC ......... *G03B 21/204* (2013.01); *G03B 21/208* (2013.01)

(58) Field of Classification Search
CPC ...... G03B 21/204; G03B 21/208; F21V 5/045
See application file for complete search history.

(56) References Cited

U.S. PATENT DOCUMENTS

| | | |
|---|---|---|
| 2012/0019791 A1 | 1/2012 | Abe et al. |
| 2012/0092628 A1 | 4/2012 | Takahashi et al. |
| 2012/0140183 A1 | 6/2012 | Tanaka et al. |
| 2012/0236266 A1 | 9/2012 | Takahashi et al. |
| 2013/0010264 A1 | 1/2013 | Takahashi et al. |
| 2013/0021582 A1 | 1/2013 | Fujita et al. |
| 2013/0235356 A1 | 9/2013 | Takahashi et al. |
| 2013/0308104 A1 | 11/2013 | Nishimori et al. |
| 2014/0028983 A1 | 1/2014 | Fujita et al. |

(Continued)

FOREIGN PATENT DOCUMENTS

| JP | 2013114980 A | 6/2013 |
|---|---|---|
| JP | 2015-053227 | 3/2015 |

(Continued)

OTHER PUBLICATIONS

Extended European Search Report dated Jul. 27, 2020, issued in corresponding European Patent Application No. 20161850.1, 6 pages.

*Primary Examiner* — Robert J May
(74) *Attorney, Agent, or Firm* — Xsensus LLP

(57) ABSTRACT

A light source optical system includes a wavelength conversion unit configured to receive first color light emitted from by an excitation light source and emit second color light with a wavelength different from a wavelength of the first color light; and a first optical system and a second optical system provided in an optical path between the excitation light source and the wavelength conversion unit. The first optical system includes one optical element having a negative power,
  wherein the second optical system as a whole has a positive power, and
  wherein Conditional Expression (1) is satisfied as follows:

$$1.8<|Fn/F2|<5.0, \qquad (1)$$

where
Fn is a focal length for a d-line of the optical element having the negative power of the first optical system, and
F2 is a focal length for the d-line of the second optical system.

18 Claims, 22 Drawing Sheets

(56) References Cited

U.S. PATENT DOCUMENTS

| | | |
|---|---|---|
| 2014/0036241 A1 | 2/2014 | Nishimori et al. |
| 2014/0049755 A1 | 2/2014 | Nishimori et al. |
| 2014/0071182 A1 | 3/2014 | Takahashi et al. |
| 2014/0071407 A1 | 3/2014 | Takahashi et al. |
| 2014/0071408 A1 | 3/2014 | Takahashi et al. |
| 2014/0240679 A1 | 8/2014 | Nishimori et al. |
| 2014/0240680 A1 | 8/2014 | Nishimori et al. |
| 2014/0268068 A1 | 9/2014 | Takahashi et al. |
| 2014/0268069 A1 | 9/2014 | Takahashi et al. |
| 2014/0268072 A1 | 9/2014 | Takahashi et al. |
| 2014/0268073 A1 | 9/2014 | Takano |
| 2014/0340649 A1 | 11/2014 | Takahashi et al. |
| 2014/0340658 A1 | 11/2014 | Takano et al. |
| 2015/0042963 A1 | 2/2015 | Nishimori et al. |
| 2015/0131062 A1 | 5/2015 | Nishimori et al. |
| 2015/0167932 A1 | 6/2015 | Yamada et al. |
| 2015/0253653 A1 | 9/2015 | Fujita et al. |
| 2015/0316840 A1 | 11/2015 | Maeda et al. |
| 2015/0370048 A1 | 12/2015 | Takano |
| 2016/0091700 A1 | 3/2016 | Takano |
| 2016/0103304 A1 | 4/2016 | Takano et al. |
| 2016/0103387 A1 | 4/2016 | Nishimori et al. |
| 2016/0109221 A1 | 4/2016 | Takahashi et al. |
| 2016/0223892 A1 | 8/2016 | Takahashi et al. |
| 2016/0320692 A1 | 11/2016 | Takahashi et al. |
| 2016/0349606 A1 | 12/2016 | Nishimori et al. |
| 2016/0377969 A1 | 12/2016 | Nishimori et al. |
| 2017/0059836 A1 | 3/2017 | Takano |
| 2017/0059971 A1 | 3/2017 | Takano et al. |
| 2017/0064268 A1 | 3/2017 | Shibayama et al. |
| 2017/0299953 A1 | 10/2017 | Maeda et al. |
| 2018/0003934 A1 | 1/2018 | Takano et al. |
| 2018/0074302 A1 | 3/2018 | Takano et al. |
| 2018/0272538 A1 | 9/2018 | Takahashi et al. |
| 2019/0129288 A1 | 5/2019 | Maeda et al. |
| 2019/0170988 A1 | 6/2019 | Takano et al. |
| 2019/0219801 A1 | 7/2019 | Takano et al. |
| 2020/0064719 A1 | 2/2020 | Nakamura et al. |

FOREIGN PATENT DOCUMENTS

| | | |
|---|---|---|
| JP | 2017-194523 | 10/2017 |
| WO | WO2014/196015 A1 | 12/2014 |
| WO | 2016148210 A1 | 9/2016 |

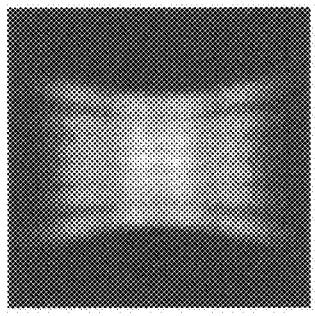
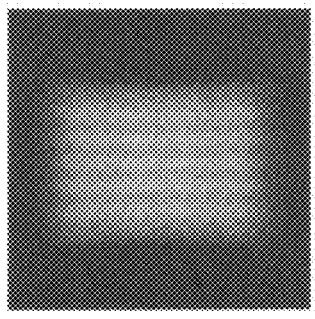
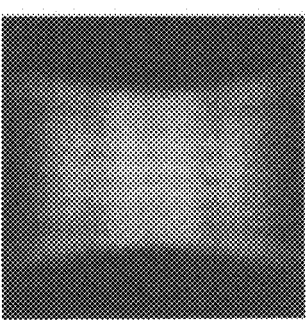
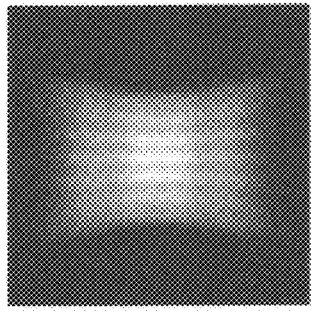
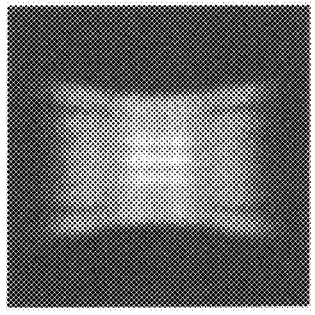
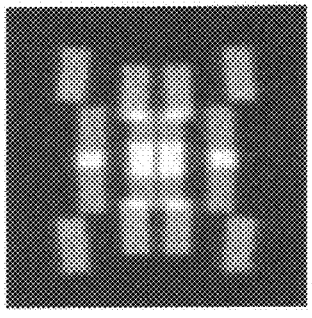
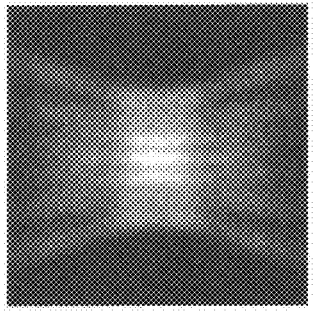
FIG. 13A
FIG. 13B
FIG. 13C
FIG. 13D
FIG. 13E
FIG. 13F
FIG. 13G

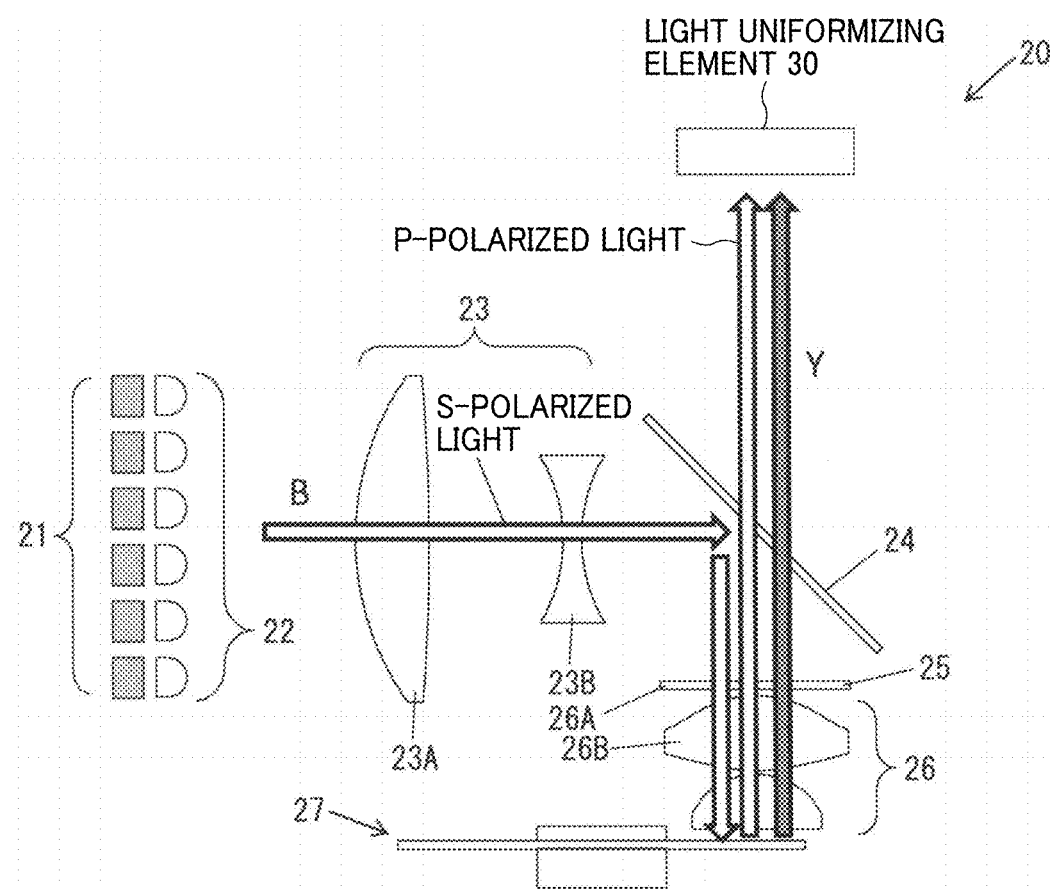

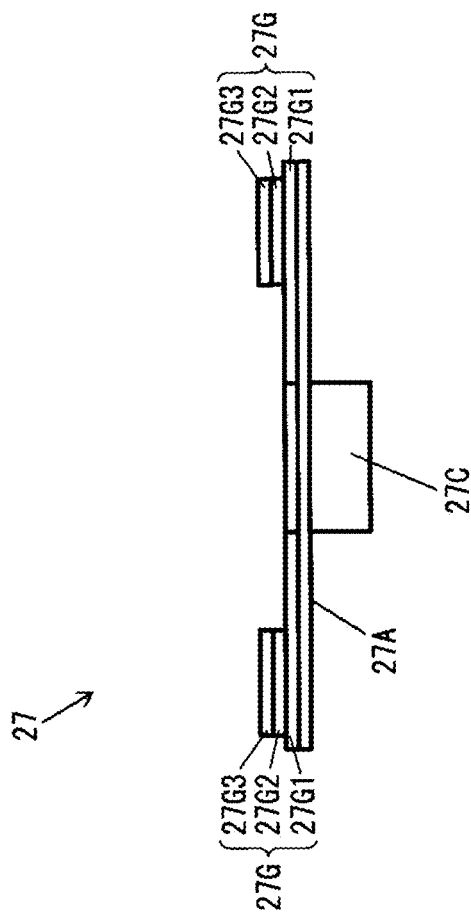
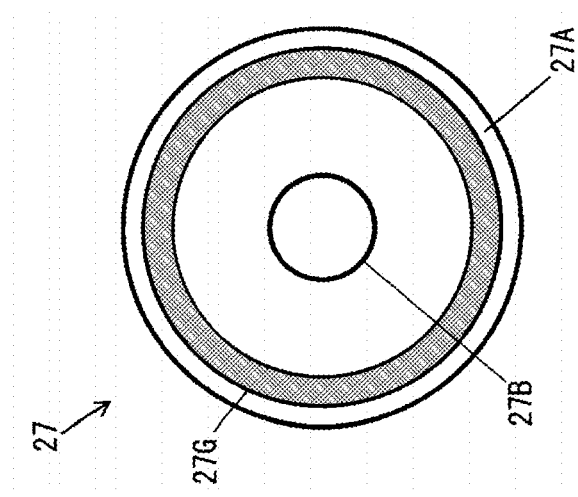

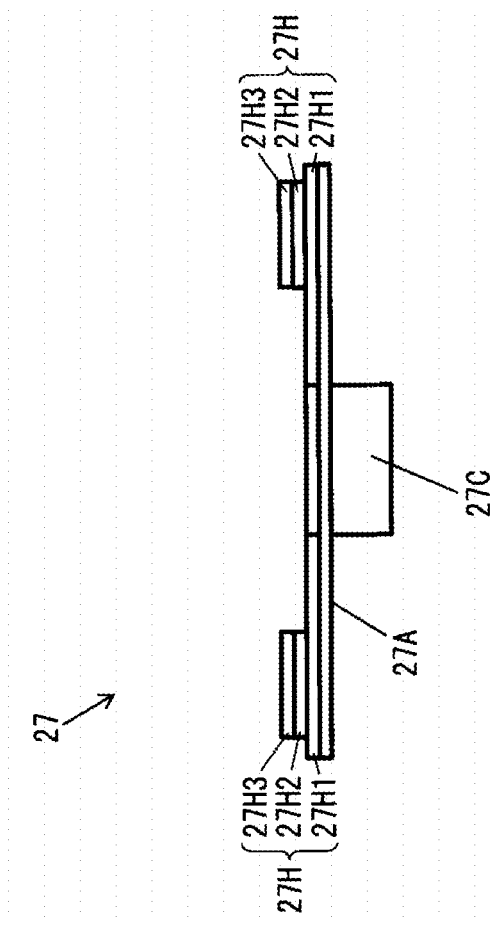
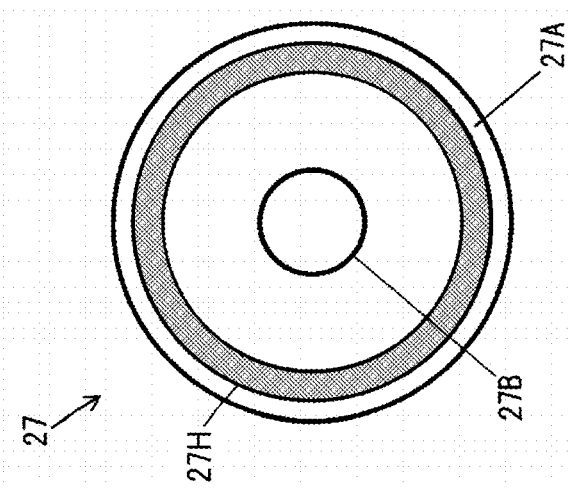

LIGHT SOURCE OPTICAL SYSTEM, LIGHT SOURCE DEVICE, AND IMAGE PROJECTION APPARATUS

CROSS-REFERENCE TO RELATED APPLICATION

This patent application is based on and claims priority pursuant to 35 U.S.C. § 119(a) to Japanese Patent Application No. 2019-050033, filed on Mar. 18, 2019, in the Japan Patent Office, the entire disclosure of which is hereby incorporated by reference herein.

BACKGROUND

Technical Field

The present disclosure relates to a light source optical system, a light source device, and an image projection apparatus.

Description of the Related Art

Projectors (image projection apparatuses) that magnify and project various images are widely used. A projector focuses light emitted by a light source onto a spatial light modulation element, such as a digital micromirror device (DMD) or a liquid crystal display element, and displays, as a color image, light modulated in accordance with an image signal and emitted from the spatial light modulation element onto a screen.

A projector in many cases uses, for example, a high-brightness extra-high-pressure mercury lamp in related art. However, the life of such a lamp is short and the maintenance is frequently required. Owing to this, the number of projectors using, for example, lasers or light emitting diodes (LEDs) instead of extra-high-pressure mercury lamps is growing. This is because a laser and an LED have longer lives and higher color reproducibility due to monochromaticity compared to an extra-high-pressure mercury lamp.

BRIEF SUMMARY

The present disclosure is completed based on the above-described awareness of disadvantages, and an object of the disclosure is to provide a light source optical system, a light source device, and an image projection apparatus that have high light utilization efficiency and that can be downsized.

A light source optical system according to an embodiment includes a wavelength conversion unit configured to receive first color light emitted from an excitation light source and emit second color light with a wavelength different from a wavelength of the first color light; and a first optical system and a second optical system provided in an optical path between the excitation light source and the wavelength conversion unit. The first optical system includes at least one optical element having a negative power. The second optical system as a whole has a positive power, and wherein Conditional Expression (1) is satisfied as follows:

$$1.8 < |Fn/F2| < 5.0, \quad (1)$$

where
Fn is a focal length for a d-line of the optical element having the negative power of the first optical system, and F2 is a focal length for the d-line of the second optical system (26).

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 13A to 13G illustrate spot shapes of light according to the first embodiment to the fifth embodiment, and first and second comparative examples;

FIG. 17 schematically illustrates a light source device according to an eighth embodiment;

FIGS. 18A and 18B illustrate a specific structure of a fluorescent-body wheel according to the eighth embodiment;

FIGS. 20A and 20B illustrate a specific structure of a fluorescent-body wheel according to the ninth embodiment;

Figure 1:
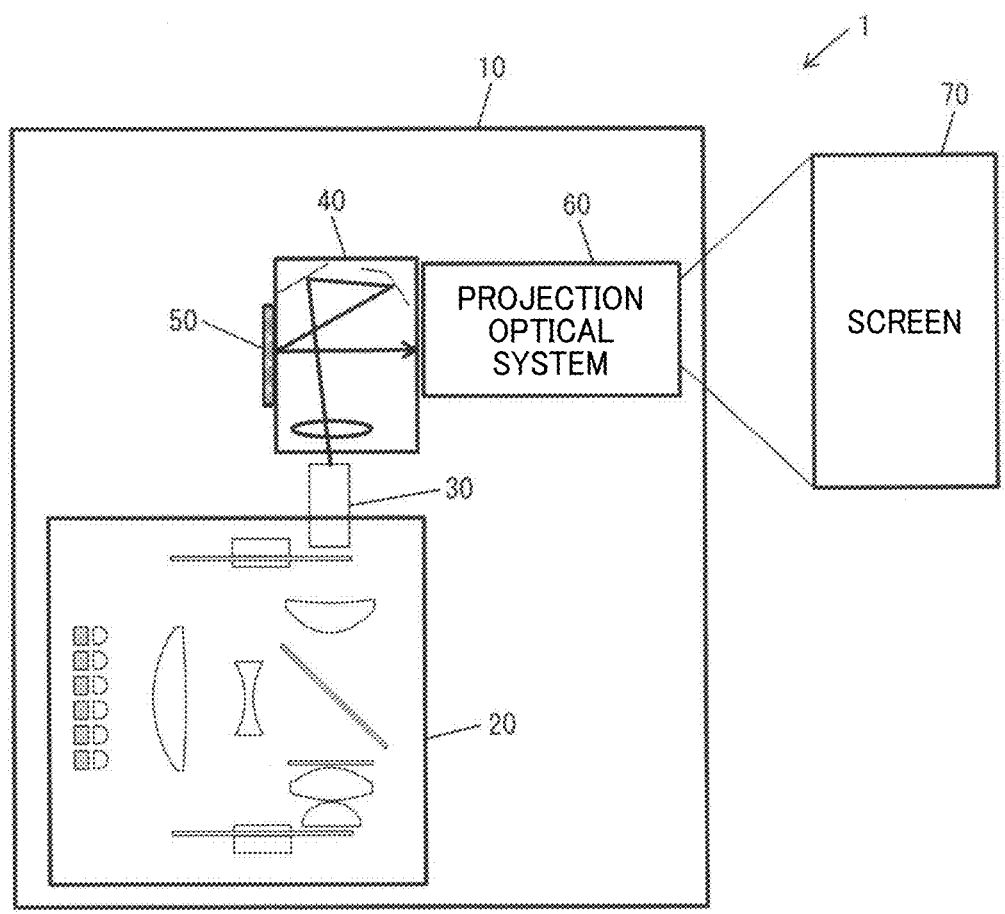
FIG. 1 schematically illustrates a projector according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

FIG. 1 schematically illustrates a projector (image projection apparatus) 1 according to a first embodiment.

The projector 1 includes a housing 10, a light source device 20, a light uniformizing element 30, an illumination optical system 40, an image forming element (image display element) 50, and a projection optical system 60.

The housing 10 houses the light source device 20, the light uniformizing element 30, the illumination optical system 40, the image forming element 50, and the projection optical system 60.

The light source device 20 emits, for example, light including wavelengths corresponding to colors of RGB. An inner configuration of the light source device 20 is described later in detail.

The light uniformizing element 30 mixes the light emitted by the light source device 20 to uniformize the light. Examples of the light uniformizing element 30 include a light tunnel that is a combination of four mirrors, a rod integrator, and a fly eye lens.

The illumination optical system 40 illuminates the image forming element 50 substantially uniformly with the light uniformized by the light uniformizing element 30. The illumination optical system 40 includes, for example, at least one lens and at least one reflecting surface.

The image forming element 50 includes, for example, a light valve, such as a digital micromirror device (DMD), a transmissive liquid crystal panel, or a reflective liquid crystal panel. The image forming element 50 modulates light provided for illumination by the illumination optical system 40 (light from a light source optical system of the light source device 20) to form an image.

The projection optical system 60 magnifies and projects the image formed by the image forming element 50 onto a screen (projection surface) 70. The projection optical system 60 includes, for example, at least one lens.

Figure 2:
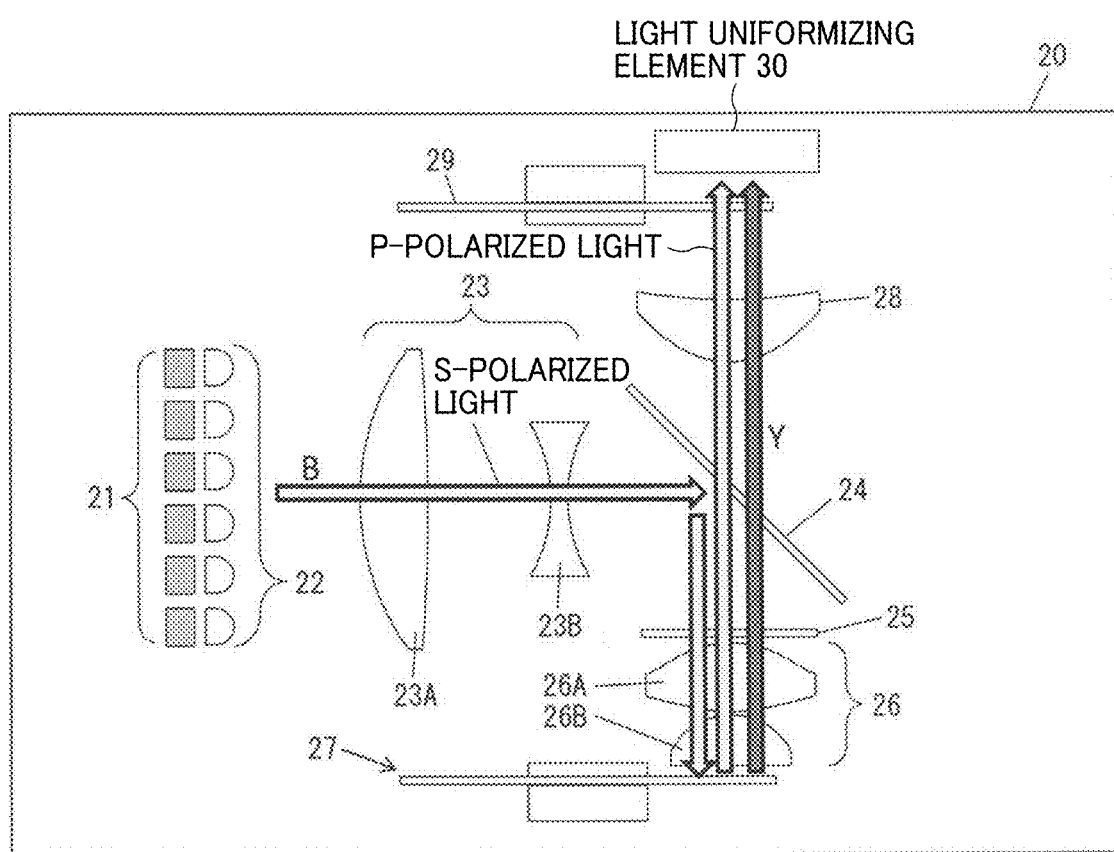
FIG. 2 schematically illustrates a light source device according to the first embodiment.

FIG. 2 schematically illustrates the light source device 20 according to the first embodiment.

The light source device 20 includes a laser source (excitation light source) 21, a collimator lens 22, a first optical system 23, a polarization beam splitter 24, a ¼ wave plate 25, a second optical system 26, a fluorescent-body wheel (wavelength conversion unit, fluorescent-body unit) 27, a condenser lens 28, and a color wheel 29 arranged in this order in a light propagation direction. For example, components of the light source device 20 other than the laser source 21 define "a light source optical system".

The laser source 21 includes a plurality of light sources (emission spots). FIG. 2 illustrates six light sources arranged in the upward and downward directions; however, a subset of six light sources is arranged in each of four lines in a direction orthogonal to the figure surface (depth direction). Thus, the number 6×4=24 of light sources in total are two-dimensionally arranged. Each light source of the laser source 21 emits, for example, light in a blue band where the center wavelength of emission intensity is 455 nm (blue laser beam) as excitation light B (first color light) that excites a fluorescent body provided in a fluorescent region (wavelength conversion region) 27D (described later) of the fluorescent-body wheel 27. The blue laser beam emitted by each light source of the laser source 21 is linear polarized light in a constant polarized state, and is arranged to be S-polarized light with respect to an incidence surface of the polarization beam splitter 24. The blue laser beam emitted by each light source of the laser source 21 is coherent light. The excitation light B emitted by each light source of the laser source 21 is not limited to light in the blue band and may be light with wavelengths that can excite the fluorescent body in the fluorescent region 27D of the fluorescent-body wheel 27. The number of light sources of the laser source 21 is not limited to 24, and may be 1 to 23, or 25 or more. The laser source 21 can include a light source unit including a plurality of light sources arrayed on a substrate (other specific examples are described later in detail).

The collimator lens 22 includes 24 collimator lenses to correspond to the 24 light sources of the laser source 21. Each collimator lens 22 adjusts the excitation light B emitted by the corresponding light source of the laser source 21 to substantially parallel light. The number of collimator lenses 22 can be increased or decreased in accordance with an increase or a decrease in the number of light sources of the laser source 21 so as to correspond to the number of light sources of the laser source 21.

The first optical system 23 as a whole has a positive power and includes a positive lens (an optical element having a positive power) 23A and a negative lens (an optical element having a negative power) 23B in this order from a side of the laser source 21 toward a side of the fluorescent-body wheel 27. The first optical system 23 guides the excitation light B incident thereon as the substantially parallel light from the collimator lenses 22 to the polarization beam splitter 24 while converging the excitation light B. A specific configuration and an advantageous effect of the first optical system 23 are described later in detail.

The polarization beam splitter 24 has a coat that reflects S-polarized light (first polarization component) in the wavelength band of the excitation light B guided from the first optical system 23, whereas transmits P-polarized light (second polarization component) in the wavelength band of the excitation light B guided from the first optical system 23 and fluorescence (second color light) from the fluorescent-body wheel 27. While the polarization beam splitter 24 having a flat-plate shape is used in the first embodiment, a prism polarization beam splitter 24 may be used. While the polarization beam splitter 24 reflects the S-polarized light in the wavelength band of the excitation light B and transmits the P-polarized light in the wavelength band of the excitation light B in the first embodiment, alternatively, the polarization beam splitter 24 may reflect the P-polarized light in the wavelength band of the excitation light B and transmit the S-polarized light in the wavelength band of the excitation light B.

As described above, the polarization beam splitter 24 is located in an optical path between the laser source 21 and the second optical system 26 (fluorescent-body wheel 27), and functions as "a reflecting surface" that reflects one of excitation light B (first color light) and fluorescence Y (second color light) and transmits the other one. The polarization beam splitter 24 folds back the optical path, thereby downsizing the light source optical system.

The ¼ wave plate 25 is arranged in a state in which the optical axis thereof is inclined by 45 degrees with respect to the linear polarized light of the excitation light B reflected by the polarization beam splitter 24. The ¼ wave plate 25 converts the excitation light B reflected by the polarization beam splitter 24 from the linear polarized light into circular polarized light.

The second optical system 26 as a whole has a positive power and includes a positive lens (an optical element having a positive power) 26A and a positive lens (an optical element having a positive power) 26B in this order from the side of the laser source 21 toward the side of the fluorescent-body wheel 27. The second optical system 26 guides the excitation light B converted into the circular polarized light and being incident thereon from the ¼ wave plate 25 to the fluorescent-body wheel 27 while converging the excitation light B. A specific configuration and an advantageous effect of the second optical system 26 are described later in detail.

Figure 3A:
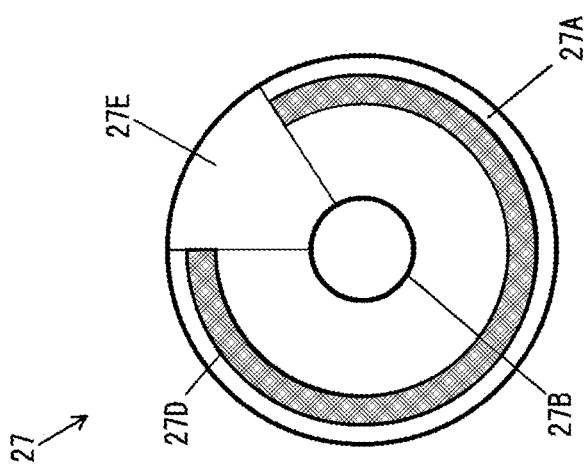
FIG. 3A illustrates a specific structure of a fluorescent-body wheel according to the first embodiment.
Figure 3B:
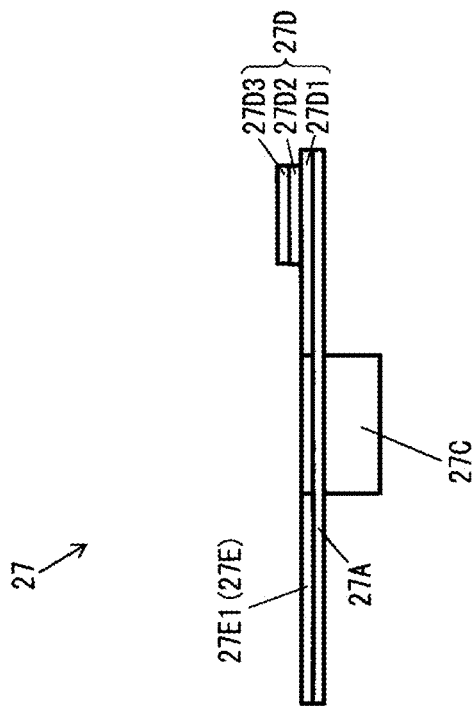
FIG. 3B illustrates the specific structure of the fluorescent-body wheel according to the first embodiment.

The excitation light B guided from the second optical system 26 is incident on the fluorescent-body wheel 27. FIGS. 3A and 3B illustrate a specific structure of the fluorescent-body wheel 27. The fluorescent-body wheel 27 includes a disk member (substrate) 27A and a driving motor (driving member) 27C that rotationally drives the disk member 27A around a rotation shaft 27B. The disk member 27A can use, but is not limited to, for example, a transparent substrate or a metal substrate (aluminum substrate etc.).

A large portion in the circumferential direction (in the first embodiment, an angular range of larger than 270°) of the fluorescent-body wheel 27 (disk member 27A) is assigned to a fluorescent region 27D, and a small portion in the circumferential direction (in the first embodiment, an angular range of smaller than 90°) is assigned to an excitation-light reflective region 27E.

The fluorescent region 27D includes a reflection coat 27D1, a fluorescent-body layer 27D2, and an anti-reflection coat (AR coat) 27D3 layered in this order from a lower-layer side toward an upper-layer side.

The reflection coat 27D1 has a characteristic of reflecting light in a wavelength region of fluorescence (emission) by the fluorescent-body layer 27D2. When the disk member 27A is made of a metal substrate with high reflectivity, the reflection coat 27D1 may be omitted (the disk member 27A may have the function of the reflection coat 27D1).

The fluorescent-body layer 27D2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27D2 may be, for example, the wavelength band of yellow, blue, green, or red. In the first embodiment, an example is described in which fluorescence (emission) has the wavelength band of yellow.

While the fluorescent body is used as the wavelength conversion element in this embodiment, a phosphorescent body or a non-linear optical crystal may be used.

The anti-reflection coat 27D3 has a characteristic of preventing reflection of light at a surface of the fluorescent-body layer 27D2.

A reflection coat (reflecting surface) 27E1 having a characteristic of reflecting light in the wavelength region of the excitation light B guided from the second optical system 26 is layered on the excitation-light reflective region 27E. When the disk member 27A is made of a metal substrate with high reflectivity, the reflection coat 27E1 may be omitted (the disk member 27A may have the function of the reflection coat 27E1).

The disk member 27A is rotationally driven by the driving motor 27C. Thus, the irradiation position with the excitation light B on the fluorescent-body wheel 27 moves over time. Consequently, a portion of the excitation light B (first color light) incident on the fluorescent-body wheel 27 is converted by the fluorescent region (wavelength conversion region) 27D into fluorescence Y (second color light) with a wavelength different from the wavelength of the excitation light B (first color light) and the fluorescence Y is emitted. The other portion of the excitation light B incident on the fluorescent-body wheel 27 is reflected by the excitation-light reflective region 27E without a change from the excitation light B and is emitted.

The fluorescent-body wheel 27 (disk member 27A) is rotated to prevent the fluorescent-body wheel 27 from being partly and continuously irradiated with the excitation light and burned, and to obtain a cooling effect of the fluorescent-body wheel 27.

The numbers and ranges of the fluorescent region 27D and the excitation-light reflective region 27E can be freely determined, and various changes can be made in design. For example, two fluorescent regions and two excitation-light reflective regions may be alternately arranged in the circumferential direction at intervals of 90°.

Referring back to FIG. 2, description is given below. The excitation light B reflected by the excitation-light reflective region 27E of the fluorescent-body wheel 27 becomes inverted circular polarized light, and passes through the second optical system 26 and the ¼ wave plate 25 again to be converted into P-polarized light. The excitation light B converted into the P-polarized light is transmitted through the polarization beam splitter 24 and is incident on the color wheel 29 through the condenser lens 28.

The excitation light B incident on the fluorescent region 27D of the fluorescent-body wheel 27 is converted into fluorescence Y and is emitted. The fluorescence Y is turned into substantially parallel light by the second optical system 26, passes through the ¼ wave plate 25, is transmitted through the polarization beam splitter 24, and is incident on the color wheel 29 through the condenser lens 28.

Figure 4:
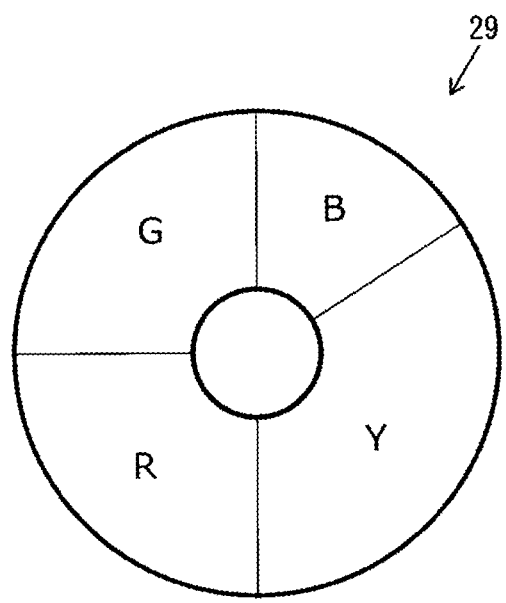
FIG. 4 schematically illustrates a color wheel.

FIG. 4 schematically illustrates the color wheel 29. The color wheel 29 includes a blue region B, a yellow region Y, a red region R, and a green region G divided in the circumferential direction. The blue region B corresponds to the excitation-light reflective region 27E of the fluorescent-body wheel 27. The yellow region Y, the red region R, and the green region G are brought into synchronization with the fluorescent region 27D of the fluorescent-body wheel 27. A transmission diffusion plate (not illustrated) is arranged on the blue region B. Thus, coherence of the laser source 21 can be reduced, and speckles on the screen 70 can be reduced. The yellow region Y directly transmits light in the wavelength region of yellow emitted from the fluorescent-body wheel 27. The red region R and the green region G use dichroic mirrors to reflect light in a non-required wavelength range from the wavelengths of yellow and hence obtain light of highly pure colors. Light of each color generated by the color wheel 29 in a time-division manner is guided from the light uniformizing element 30 through the illumination optical system 40 to the image forming element 50, forms an image corresponding to the color, and magnifies and projects the image onto the screen 70 by the projection optical system 60. Thus, a color image is obtained.

In the first embodiment, the light source optical system includes the laser source 21, the fluorescent-body wheel 27, and the first optical system 23 having a positive power and the second optical system 26 having a positive power, which are provided in this order in an optical path between the laser source 21 and the fluorescent-body wheel 27.

The first optical system 23 transmits the excitation light B of S-polarized light but does not transmit the fluorescence Y. The second optical system 26 transmits the excitation light B of S-polarized light, the excitation light B of P-polarized light, and the fluorescence Y. Thus, the first optical system 23 and the second optical system 26 are divided in terms of that the first optical system 23 does not transmit the fluorescence Y and the second optical system 26 transmits the fluorescence Y. This is a first example of the way of dividing (the way of sectioning) the first optical system 23 and the second optical system 26.

The first optical system 23 and the second optical system 26 are divided in terms of that the first optical system 23 does not transmit 50% or more of the fluorescence (second color light) from the fluorescent-body wheel 27 and the second optical system 26 transmits 50% or more of the fluorescence (second color light) from the fluorescent-body wheel 27. This is a second example of the way of dividing (the way of sectioning) the first optical system 23 and the second optical system 26.

The first optical system 23 and the second optical system 26 are divided at a position of the maximum air gap. This is a third example of the way of dividing (the way of sectioning) the first optical system 23 and the second optical system 26.

The polarization beam splitter (reflecting surface) 24 is located in an optical path between the laser source 21 and the fluorescent-body wheel (wavelength conversion unit) 27. The first optical system 23 is disposed between the laser source 21 and the polarization beam splitter (reflecting surface) 24, and the second optical system 26 is disposed between the polarization beam splitter (reflecting surface) 24 and the fluorescent-body wheel (wavelength conversion unit) 27. This is a fourth example of the way of dividing (the way of sectioning) the first optical system 23 and the second optical system 26.

Figure 5:
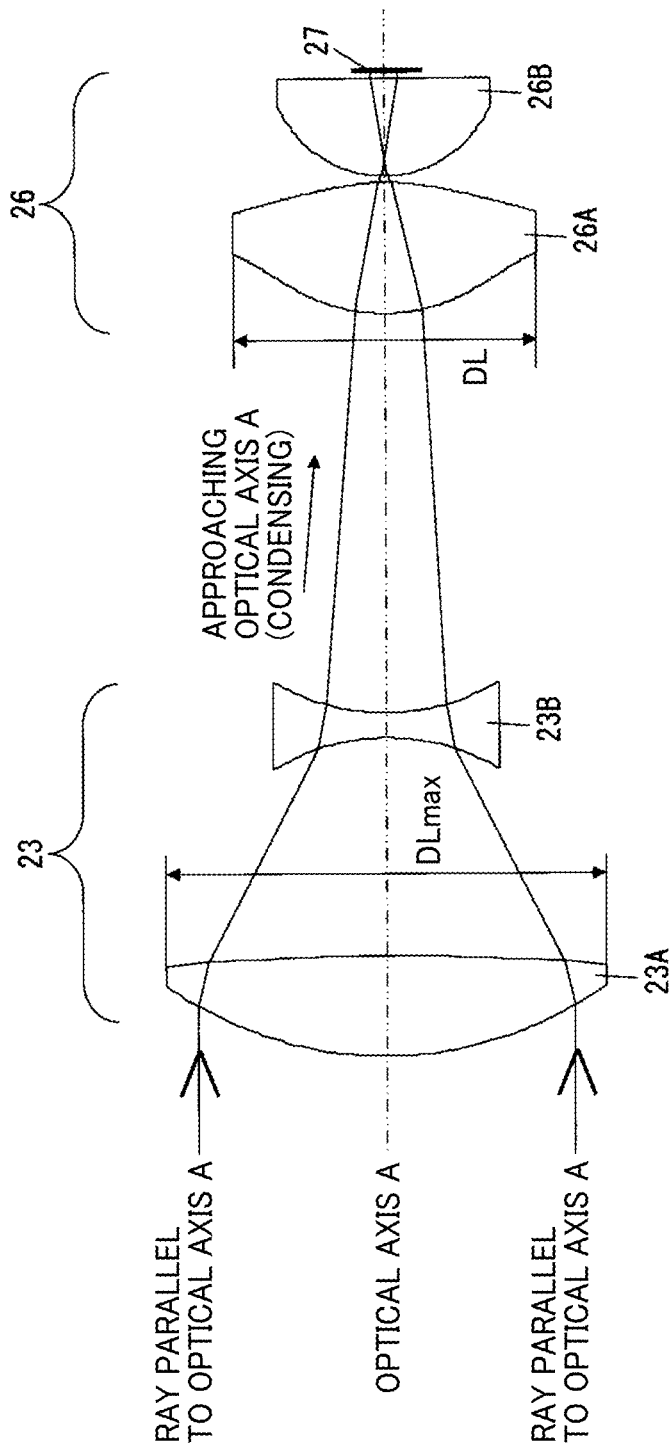
FIG. 5 illustrates an example of configurations of and rays passing through a first optical system and a second optical system according to the first embodiment.

FIG. 5 illustrates an example of configurations of and rays passing through the first optical system 23 and the second optical system 26 according to the first embodiment. Table 1 and Table 2 present lens data and aspherical surface data of the first optical system 23 and the second optical system 26. In Table 1 and Table 2, R denotes a curvature radius (a paraxial curvature radius for an aspherical surface), D denotes a surface distance, Nd denotes a refractive index, vd denotes an Abbe number, K denotes a conic constant of an aspherical surface, and Ai denotes an aspherical constant of i-th order. A surface number with * mark in the table is an aspherical surface. An aspherical shape is expressed by Equation (1) as follows when C is the reciprocal of a paraxial curvature radius (paraxial curvature), H is a height from the optical axis, K is a conic constant, and X is an aspherical amount in the optical-axis direction using an aspherical coefficient of each order. That is, a paraxial curvature radius, a conic constant, and an aspherical coefficient are given to determine an aspherical shape.

$$X = \frac{C \cdot H^2}{1 + \sqrt{(1-(1+K) \cdot C^2 \cdot H^2)}} + \sum_{i=1} Ai \cdot H^i \qquad \text{Equation (1)}$$

TABLE 1

Lens Data

| | R | D | Nd | vd | Glass member | |
|---|---|---|---|---|---|---|
| 1 | ∞ | 2 | | | | |
| 2 | 30 | 8 | 1.7432 | 49.3394 | S-LAM60 | OHARA |
| 3 | −210 | 17.4 | | | | |
| 4 | −17.5 | 2 | 1.48749 | 70.2363 | S-FSL5 | OHARA |
| 5 | 17.5 | 35 | | | | |
| 6* | 13.9 | 10.5 | 1.58913 | 61.1526 | L-BAL35 | OHARA |
| 7* | −16.35 | 0.5 | | | | |
| 8 | 9.00 | 7.7 | 1.62041 | 60.2896 | S-BSM16 | OHARA |
| 9 | ∞ | 0.7 | | | | |

TABLE 2

Aspherical Surface Data

| | K | A4 | A6 | A8 |
|---|---|---|---|---|
| 6-th surface | −0.55865 | 3.4062E−05 | −2.4706E−07 | −2.1131E−09 |
| 7-th surface | −10.8169 | 4.8564E−05 | −6.3144E−07 | 2.2753E−09 |

In the first optical system 23, the positive lens 23A has a biconvex shape and the negative lens 23B has a biconcave shape according to the first embodiment. In the second optical system 26, the positive lens 26A has a biconvex shape and the positive lens 26B has a planoconvex shape being convex toward the object side. Moreover, the positive lens 26A has aspherical surfaces on both sides. Although not illustrated, an aperture stop for adjusting the light intensity of the excitation light B is provided (Surface No. 1) at a position immediately before the positive lens 23A of the first optical system 23.

As illustrated in FIG. 5, the first optical system 23 has an optical characteristic such that, when rays parallel to an optical axis A of the first optical system 23 are incident on the first optical system 23, rays emitted from the first optical system 23 are incident on the second optical system 26 while approaching the optical axis A (condensing) at an angle with respect to the optical axis A. Thus, a focal point of light incident on the second optical system 26 is formed on a side of the second optical system 26 (near side) with respect to the incidence surface of the fluorescent-body wheel 27. Consequently, a spot shape is faded and uniformized, thereby obtaining a large-size and uniform image; and the light condensing density at the fluorescent-body wheel 27 is decreased, thereby increasing light conversion efficiency.

Second Embodiment

Figure 6:
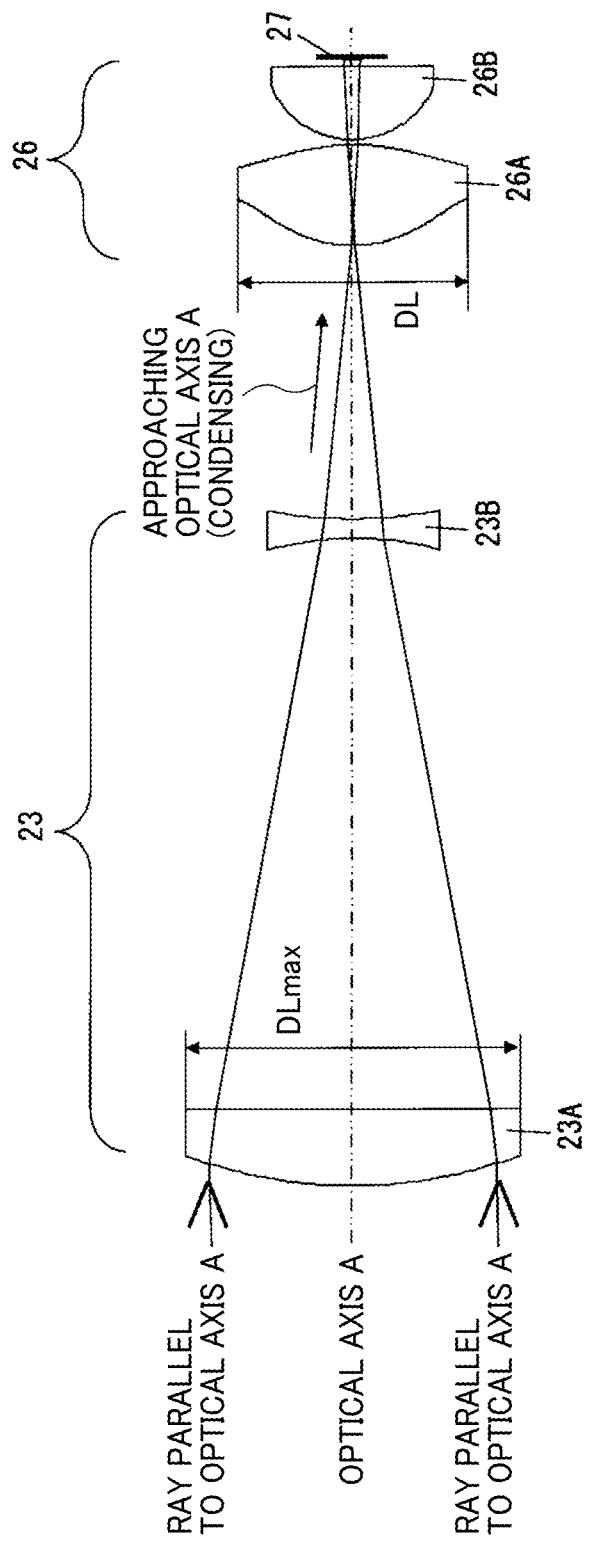
FIG. 6 illustrates an example of configurations of and rays passing through a first optical system and a second optical system according to a second embodiment.

FIG. 6 illustrates an example of configurations of and rays passing through a first optical system 23 and a second optical system 26 according to a second embodiment. Table 3 and Table 4 present lens data and aspherical surface data of the first optical system 23 and the second optical system 26. The first optical system 23 and the second optical system 26 according to the second embodiment have configurations similar to the configurations of the first optical system 23 and the second optical system 26 according to the first embodiment (the parameters of the lens curvature, lens distance, and so forth, are different).

TABLE 3

Lens Data

| | R | D | Nd | vd | Glass member | |
|---|---|---|---|---|---|---|
| 1 | ∞ | 2 | | | | |
| 2 | 50.5 | 8 | 1.58913 | 61.135 | S-BAL35 | OHARA |
| 3 | −4355 | 60 | | | | |
| 4 | −33.5 | 2 | 1.51633 | 64.142 | S-BSL7 | OHARA |
| 5 | 50 | 28.8 | | | | |
| 6* | 13.9 | 10.5 | 1.58913 | 61.1526 | L-BAL35 | OHARA |
| 7* | −16.35 | 0.5 | | | | |
| 8 | 9 | 7.7 | 1.62041 | 60.2896 | S-BSM16 | OHARA |
| 9 | ∞ | 0.7 | | | | |

TABLE 4

Aspherical Surface Data

| | K | A4 | A6 | A8 |
|---|---|---|---|---|
| 6-th surface | −0.55865 | 3.4062E−05 | −2.4706E−07 | −2.1131E−09 |
| 7-th surface | −10.8169 | 4.8564E−05 | −6.3144E−07 | 2.2753E−09 |

Third Embodiment

Figure 7:
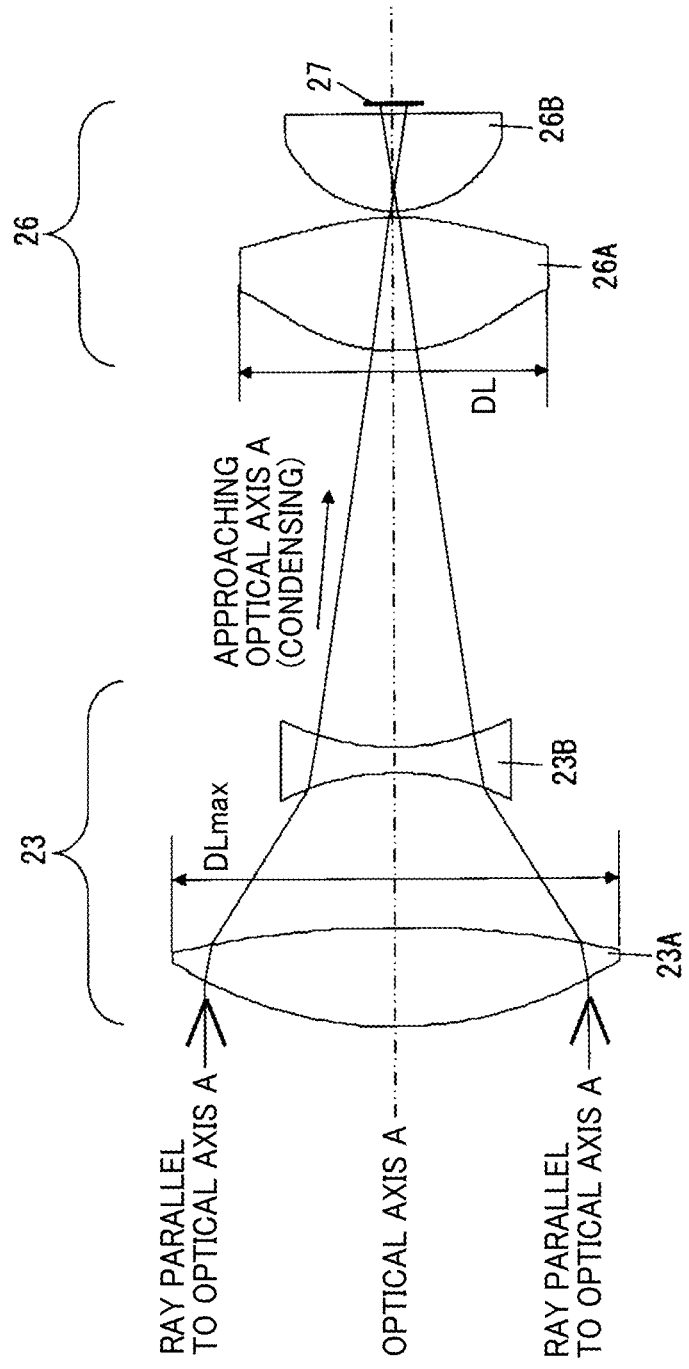
FIG. 7 illustrates an example of configurations of and rays passing through a first optical system and a second optical system according to a third embodiment.

FIG. 7 illustrates an example of configurations of and rays passing through a first optical system 23 and a second optical system 26 according to a third embodiment. Table 5 and Table 6 present lens data and aspherical surface data of the first optical system 23 and the second optical system 26. The first optical system 23 and the second optical system 26 according to the third embodiment have configurations similar to the configurations of the first optical system 23 and the second optical system 26 according to the first embodiment (the parameters of the lens curvature, lens distance, and so forth, are different).

TABLE 5

Lens Data

| | R | D | Nd | vd | Glass member | |
|---|---|---|---|---|---|---|
| 1 | ∞ | 2 | | | | |
| 2 | 32.46 | 7.8 | 1.7432 | 49.3394 | S-LAM60 | OHARA |
| 3 | −80.94 | 12.2 | | | | |
| 4 | −19.69 | 2 | 1.48749 | 70.2363 | S-FSL5 | OHARA |
| 5 | 19.69 | 31.2 | | | | |
| 6* | 13.9 | 10.5 | 1.58913 | 61.1526 | L-BAL35 | OHARA |
| 7* | −16.35 | 0.5 | | | | |
| 8 | 9 | 7.7 | 1.62041 | 60.2896 | S-BSM16 | OHARA |
| 9 | ∞ | 0.7 | | | | |

TABLE 6

Aspherical Surface Data

| | K | A4 | A6 | A8 |
|---|---|---|---|---|
| 6-th surface | −0.55865 | 3.4062E−05 | −2.4706E−07 | −2.1131E−09 |
| 7-th surface | −10.8169 | 4.8564E−05 | −6.3144E−07 | 2.2753E−09 |

Fourth Embodiment

Figure 8:
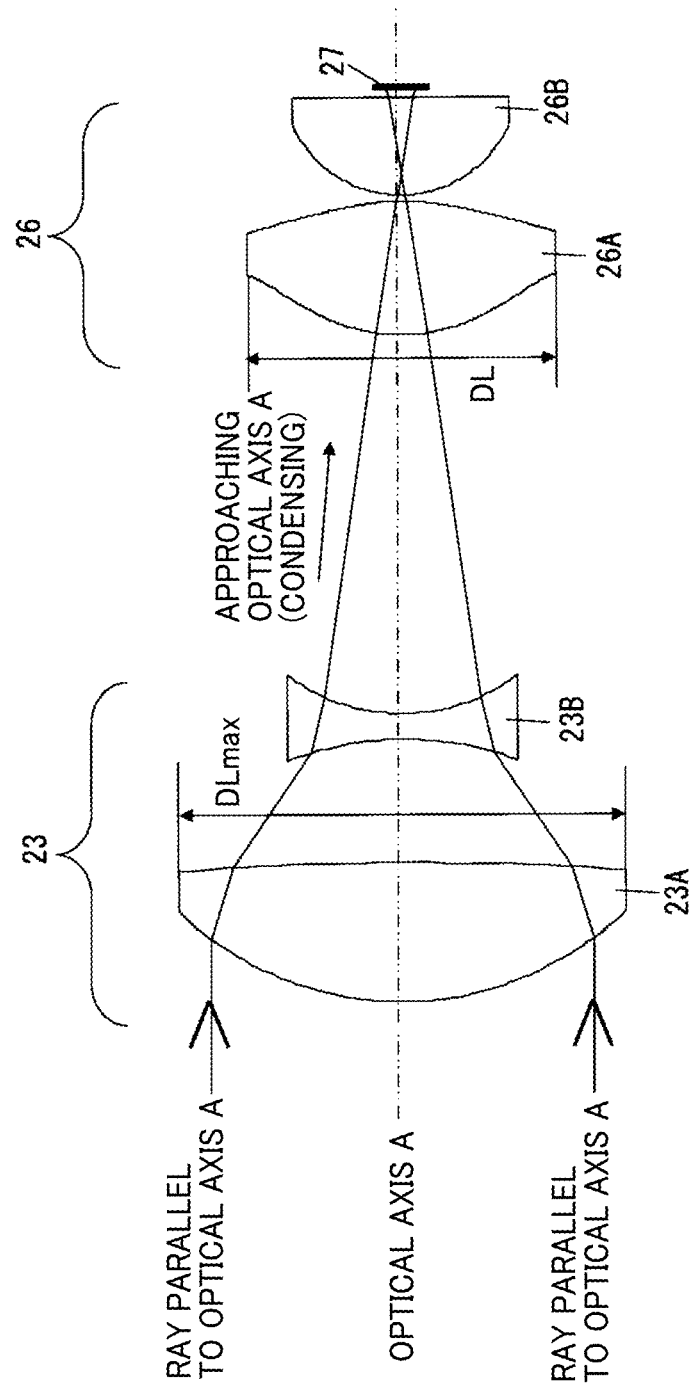
FIG. 8 illustrates an example of configurations of and rays passing through a first optical system and a second optical system according to a fourth embodiment.

FIG. 8 illustrates an example of configurations of and rays passing through a first optical system 23 and a second optical system 26 according to a fourth embodiment. Table 7 and Table 8 present lens data and aspherical surface data of the first optical system 23 and the second optical system 26. The first optical system 23 and the second optical system 26 according to the fourth embodiment have configurations similar to the configurations of the first optical system 23 and the second optical system 26 according to the first embodiment (the parameters of the lens curvature, lens distance, and so forth, are different).

TABLE 7

Lens Data

| | R | D | Nd | vd | Glass member | |
|---|---|---|---|---|---|---|
| 1 | ∞ | 2 | | | | |
| 2 | 25.00 | 11 | 1.7432 | 49.3394 | S-LAM60 | OHARA |
| 3 | −234.35 | 9.68 | | | | |
| 4 | −25.00 | 2 | 1.51633 | 64.142 | S-BSL7 | OHARA |
| 5 | 15.00 | 29.8 | | | | |
| 6* | 13.9 | 10.5 | 1.58913 | 61.1526 | L-BAL35 | OHARA |
| 7* | −16.35 | 0.5 | | | | |
| 8 | 9 | 7.7 | 1.62041 | 60.2896 | S-BSM16 | OHARA |
| 9 | ∞ | 0.7 | | | | |

TABLE 8

Aspherical Surface Data

| | K | A4 | A6 | A8 |
|---|---|---|---|---|
| 6-th surface | −0.55865 | 3.4062E−05 | 2.4706E−07 | −2.1131E−09 |
| 7-th surface | −10.8169 | 4.8564E−05 | 6.3144E−07 | 2.2753E−09 |

Fifth Embodiment

Figure 9:
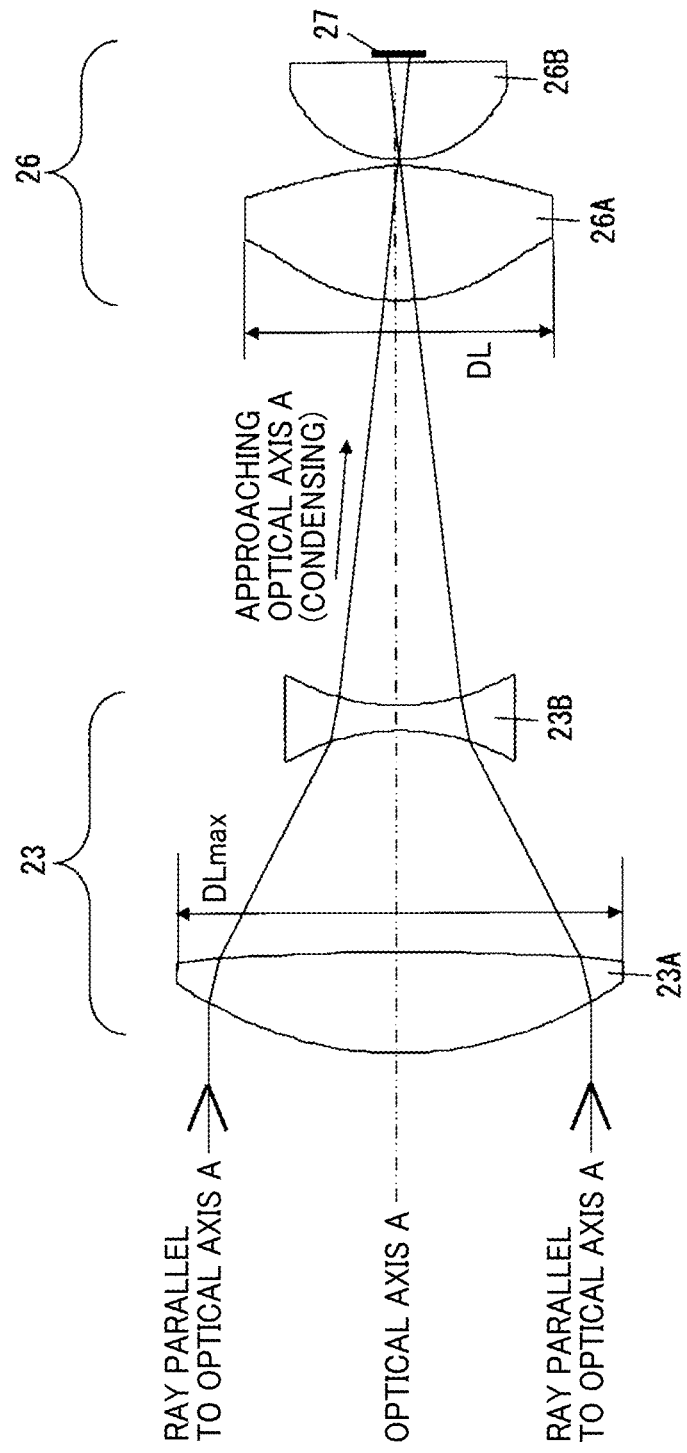
FIG. 9 illustrates an example of configurations of and rays passing through a first optical system and a second optical system according to a fifth embodiment.

FIG. 9 illustrates an example of configurations of and rays passing through a first optical system 23 and a second optical system 26 according to a fifth embodiment. Table 9 and Table 10 present lens data and aspherical surface data of the first optical system 23 and the second optical system 26. The first optical system 23 and the second optical system 26 according to the fifth embodiment have configurations similar to the configurations of the first optical system 23 and the second optical system 26 according to the first embodiment (the parameters of the lens curvature, lens distance, and so forth, are different).

TABLE 9

Lens Data

| | R | D | Nd | vd | Glass member | |
|---|---|---|---|---|---|---|
| 1 | ∞ | 2 | | | | |
| 2 | 30.00 | 8 | 1.7432 | 49.3394 | S-LAM60 | OHARA |
| 3 | −210.00 | 17.40 | | | | |
| 4 | −17.50 | 2 | 1.51633 | 64.142 | S-BSL7 | OHARA |
| 5 | 17.50 | 31.9 | | | | |
| 6* | 13.9 | 10.5 | 1.58913 | 61.1526 | L-BAL35 | OHARA |
| 7* | −16.35 | 0.5 | | | | |
| 8 | 9 | 7.7 | 1.62041 | 60.2896 | S-BSM16 | OHARA |
| 9 | ∞ | 0.7 | | | | |

TABLE 10

Aspherical Surface Data

|  | K | A4 | A6 | A8 |
|---|---|---|---|---|
| 6-th surface | −0.55865 | 3.4062E−05 | −2.4706E−07 | −2.1131E−09 |
| 7-th surface | −10.8169 | 4.8564E−05 | −6.3144E−07 | 2.2753E−09 |

As presented in the above-described first embodiment to fifth embodiment, the first optical system 23 includes at least one optical element (positive lens 23A) having a positive power, and at least one optical element (negative lens 23B) having a negative power. The second optical system 26 as a whole has a positive power.

According to the embodiment, Conditional Expression (1) is desirably satisfied as follows:

$$1.8 < |Fn/F2| < 5.0, \quad (1)$$

where
Fn is a focal length for the d-line of an optical element having a negative power of the first optical system, and
F2 is a focal length for the d-line of the second optical system.

Typically, the conversion efficiency of a wavelength conversion unit such as a fluorescent body is inversely proportional to the light condensing density of excitation light on a wavelength conversion element. When the conversion efficiency is higher than or equal to a certain light condensing density, a burn may occur. Power arrangement of the optical element (negative lens 23B) having a negative power of the first optical system 23 and the second optical system 26 serving as a condenser optical system is set in a proper range that satisfies Conditional Expression (1). Thus, a light beam can be thinned so that an incidence optical path and an emission optical path on and from the fluorescent-body wheel (wavelength conversion unit) 27 do not interfere with each other. Consequently, spots of excitation light on the fluorescent-body wheel (wavelength conversion unit) 27 can be uniformized. Thus, the light condensing density can be decreased, and the light conversion efficiency can be increased. Moreover, the light source optical system can be downsized.

If the value is below the lower limit of Conditional Expression (1), the light source optical system can be downsized; however, the light condensing density of the excitation light on the wavelength conversion unit excessively increases. Thus, the light conversion efficiency is decreased, and a burn may occur. If the value is above the upper limit of Conditional Expression (1), spots of the excitation light on the wavelength conversion element can be uniformized. Thus, the light condensing density can be decreased, and the light conversion efficiency can be increased. However, the light source optical system may increase in size.

Within the conditional-expression range of Conditional Expression (1), Conditional Expression (1') is desirably satisfied as follows:

$$1.9 < |Fn/F2| < 4.5. \quad (1')$$

According to the embodiment, Conditional Expression (2) is desirably satisfied as follows:

$$1.5 < |Fp/Fn| < 2.4, \quad (2)$$

where
Fp is a focal length for the d-line of an optical element having a positive power of the first optical system, and
Fn is the focal length for the d-line of the optical element having the negative power of the first optical system.

Conditional Expression (2) determines a reduction ratio of light beams by the first optical system 23. Conditional Expression (2) is satisfied to optimize the light condensing density of a spot on the fluorescent-body wheel (wavelength conversion unit) 27 and hence to optimize the light conversion efficiency. Conditional Expressions (1) and (2) are both satisfied to downsize the light source optical system and to increase the light conversion efficiency at high levels.

If the value is below the lower limit of Conditional Expression (2), the light condensing density of a spot on the wavelength conversion unit increases, thereby decreasing the light conversion efficiency. If the value is above the upper limit of Conditional Expression (2), the light condensing density of a spot on the wavelength conversion unit decreases, thereby increasing the light conversion efficiency. However, the light condensing density of a lens included in the second optical system increases, and a disadvantage such as melting of a lens may occur.

Figure 10:
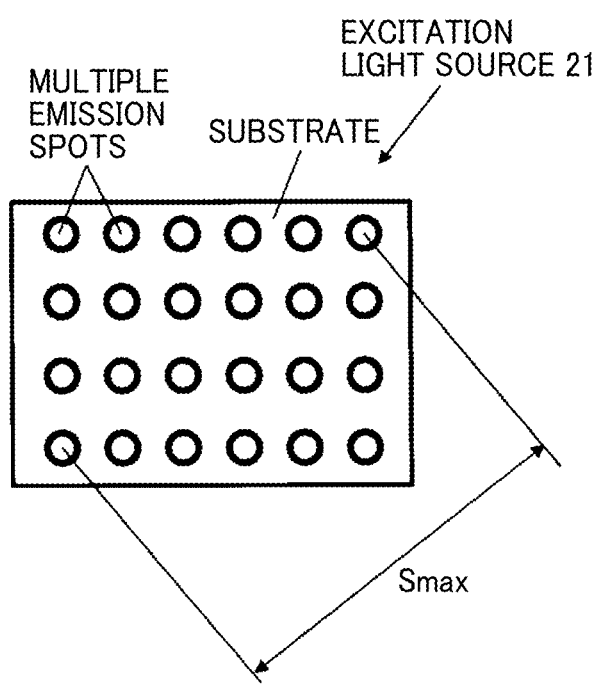
FIG. 10 illustrates examples of a plurality of emission spots of an excitation light source.

FIG. 10 illustrates an example of a plurality of emission spots at the laser source 21. As illustrated in FIG. 10, the laser source 21 includes a plurality of emission spots arranged in a two-dimensional array. The plurality of emission spots of the laser source 21 may use, for example, laser diodes (LDs) arranged at a metal block, or a multi-chip component in which laser diode (LD) chips are arranged on a single substrate. In this case, when S is a distance between any two emission spots from among the emission spots arranged in an array, the maximum distance (the maximum distance between two emission spots from among the plurality of emission spots) is defined as Smax. Referring to the example in FIG. 10, the distance between two spots located in the diagonal direction is the maximum distance, and hence the distance is defined as Smax.

Referring to FIGS. 5 to 9, the outer diameter of an optical element (in this case, the positive lens 26A) of the second optical system 26 disposed on a side of the first optical system 23 is defined as DL. The maximum outer diameter of an optical element (in this case, the outer diameter of the positive lens 23A) included in any one of the first optical system 23 and the second optical system 26 is defined as DLmax.

According to the embodiment, Conditional Expression (3) is desirably satisfied as follows:

$$Smax/DL < 2.0, \quad (3)$$

where
Smax is the maximum distance between two emission spots from among the plurality of emission spots, and
DL is an outer diameter of an optical element of the second optical system disposed on a side of the first optical system (a side of incidence of excitation light).

Conditional Expression (3) determines a size of the plurality of emission spots at the laser source 21. Conditional Expression (3) is satisfied to decrease the light condensing density on the fluorescent body and to increase the light conversion efficiency. If the value is above the upper limit of Conditional Expression (3), when the spot diameter on the fluorescent body is to be a desirable size, it is required to increase the reduction ratio of the light source optical system. Consequently, an image of each emission spot on the wavelength conversion unit becomes small and the light condensing density increases, thereby decreasing the light conversion efficiency.

Figure 11:
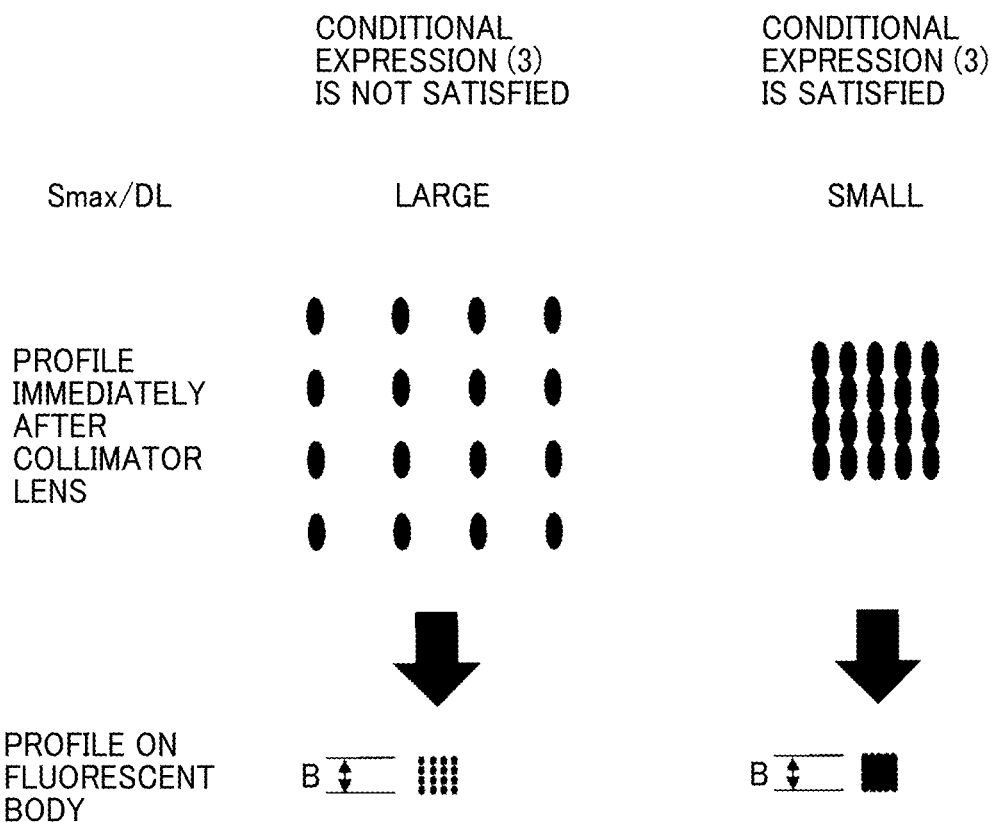
FIG. 11 illustrates an example of profiles of light when Conditional Expression (3) is satisfied and not satisfied.

FIG. 11 illustrates an example of profiles of light when Conditional Expression (3) is satisfied and not satisfied. As illustrated in FIG. 11, two cases are compared with each other, in both the cases, profiles immediately after the collimator lenses corresponding to the respective emission spots are the same. The two cases includes a case where the value of Conditional Expression (3) is larger than 2 (left side), and a case where the value of Conditional Expression (3) is smaller than or equal to 2 (right side). In this situation, when the entire sizes B of the profiles on the fluorescent body are made uniform, if the value of Conditional Expression (3) is larger than 2 (left side), the reduction ratio is larger than that when the value of Conditional Expression (3) is smaller than or equal to 2. Each emission spot becomes small and the light condensing density increases.

Within the conditional-expression range of Conditional Expression (3), Conditional Expression (3') is desirably satisfied as follows:

$$Smax/DL<1.7. \quad (3')$$

According to the embodiment, Conditional Expression (4) is desirably satisfied as follows:

$$0.5<Smax/DLmax<1.0, \quad (4)$$

where
Smax is the maximum distance between two emission spots from among the plurality of emission spots, and
DLmax is the maximum outer diameter of an optical element included in any one of the first optical system (23) and the second optical system (26).

Conditional Expression (4) is satisfied to decrease the size and cost of the light source device, and to increase the light conversion efficiency. If the value is below the lower limit of Conditional Expression (4), the lens outer diameter increases, and the light source device increases in size and cost inevitably. If the value is above the upper limit of Conditional Expression (4), the size and cost of the light source device can be decreased by a certain degree; however, the light conversion efficiency may be decreased.

As illustrated in FIG. 10, the plurality of emission spots of the laser source 21, in particular, two emission spots that satisfy Smax are desirably arranged on a single substrate. Thus, the laser source 21 including the plurality of emission spots can be easily made.

As illustrated in FIGS. 2 and 10, the laser source 21 includes the plurality of emission spots arranged in the two-dimensional array. As illustrated in FIG. 2, the light source device 20 includes the plurality of collimator lenses 22 corresponding to the plurality of respective emission spots of the laser source 21.

According to the embodiment, Conditional Expression (5) is desirably satisfied as follows:

$$0.5<Px/L \cdot \tan \theta x<2.0, \quad (5)$$

where
θx is, when a direction in which an angle of divergence of each emission point becomes maximum is an X direction, an angle of divergence of each emission spot in the X direction;
Px is, when a direction in which an angle of divergence of each emission spot becomes maximum is an X direction, a pitch of emission spots in the X direction; and L is a distance between (the emission surface of) each emission spot and a corresponding collimator lens.

Figure 12:
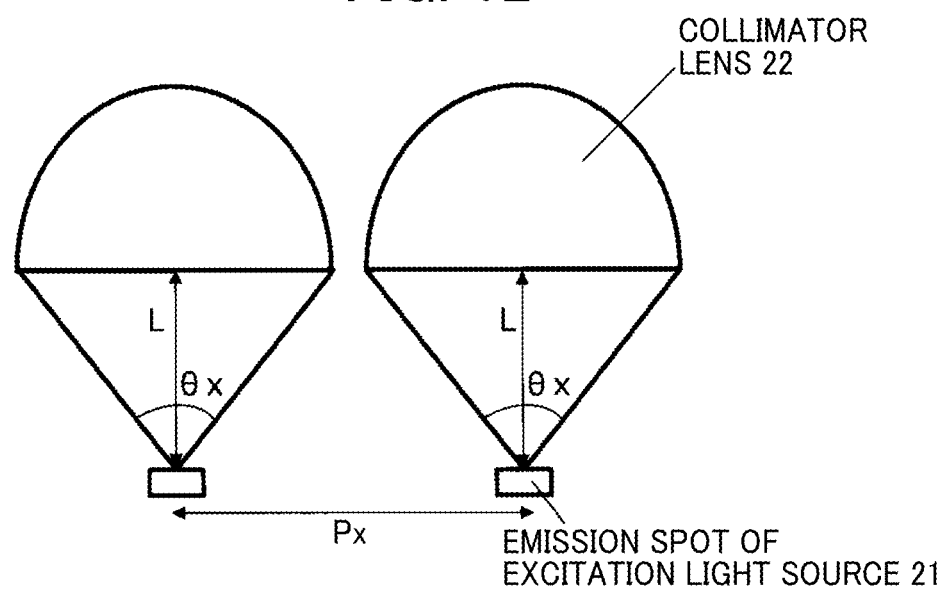
FIG. 12 conceptually illustrates each parameter in Conditional Expression (5)

FIG. 12 conceptually illustrates each parameter in Conditional Expression (5) in such a manner that the angle of divergence Ox, the pitch Px, and the distance L are visually recognizable.

Conditional Expression (5) is satisfied to decrease the distance between profiles of emission spots of the laser source 21. Whole profiles are in a dense state, uniform profiles can be obtained when reduced in size on the fluorescent body, and the fluorescent-body conversion efficiency can be increased.

If the value is above the upper limit of Conditional Expression (5), distances among emission spots of the laser source 21 increase and hence distances among profiles of emission spots increase. In this case, as described above, to obtain a desirable spot size on the wavelength conversion unit, the reduction rate increases, the image of each emission spot decreases in size, the light condensing density on the wavelength conversion unit increases, and the wavelength conversion efficiency decreases. If the value is below the lower limit of Conditional Expression (5), uniform profiles are likely obtained on the wavelength conversion unit. However, light from each emission spot may be incident on adjacent collimator lenses, and rays may partly propagate in a direction in which the rays are not used. Such rays may become stray light and the light conversion efficiency may decrease.

According to the embodiment, Conditional Expression (6) is desirably satisfied as follows:

$$1.6<Ndave<1.9, \quad (6)$$

where
Ndave is an average value of refractive indices for the d-line of a plurality of optical elements included in the second optical system.

The conditional expression (6) determines an optimal range of refractive indices of optical elements (in this case, the positive lens 26A and the positive lens 26B) included in the second optical system 26. Conditional Expression (6) is satisfied to increase the light conversion efficiency of the light source optical system, and to downsize the light source optical system.

If the value is above the upper limit of Conditional Expression (6), the transmissivity of light with short wavelengths decreases, the transmissivity of excitation light decreases, and the light conversion efficiency of the light source optical system decreases. If the value is below the lower limit of Conditional Expression (6), the lens thickness or the like increases, and the light source optical system increases in size. Moreover, aberrations increase, and spots are not uniformized. Thus, the light condensing density of excitation light on the wavelength conversion unit increases, and the conversion efficiency of fluorescent decreases.

Table 11 presents numerical values corresponding to Conditional Expression (1) to Conditional Expression (6) according to the first embodiment to the fifth embodiment. As presented in Table 11, the first embodiment to the fifth embodiment satisfy Conditional Expression (1) to Conditional Expression (6).

TABLE 11

|  | First embodiment | Second embodiment | Third embodiment | Fourth embodiment | Fifth embodiment |
|---|---|---|---|---|---|
| Fn | −17.62 | −38.54 | −19.86 | −17.85 | −16.62 |
| Fp | 35.8 | 84.8 | 32.1 | 31.0 | 35.8 |

TABLE 11-continued

| | First embodiment | Second embodiment | Third embodiment | Fourth embodiment | Fifth embodiment |
|---|---|---|---|---|---|
| F2 | 8.65 | 8.65 | 8.65 | 8.65 | 8.65 |
| Smax | 23 | 23 | 23 | 23 | 23 |
| DL | 25 | 25 | 25 | 25 | 25 |
| Px | 6 | 6 | 6 | 6 | 6 |
| L | 4.3 | 4.3 | 4.3 | 4.3 | 4.3 |
| θx | 45 | 45 | 45 | 45 | 45 |
| DLmax | 31 | 31 | 31 | 31 | 31 |
| Conditional Expression (1) | 2.04 | 4.45 | 2.30 | 2.06 | 1.92 |
| Conditional Expression (2) | 2.03 | 2.20 | 1.62 | 1.73 | 2.16 |
| Conditional Expression (3) | 0.92 | 0.92 | 0.92 | 0.92 | 0.92 |
| Conditional Expression (4) | 0.74 | 0.74 | 0.74 | 0.74 | 0.74 |
| Conditional Expression (5) | 1.40 | 1.40 | 1.40 | 1.40 | 1.40 |
| Conditional Expression (6) | 1.605 | 1.605 | 1.605 | 1.605 | 1.605 |

FIGS. 13A to 13G illustrate spot shapes of light according to the first embodiment to the fifth embodiment, and first and second comparative examples. The first and second comparative examples do not satisfy a portion or the entirety of lens configurations that are constituent features according to the embodiment or Conditional Expression (1) to Conditional Expression (6). FIGS. 13A to 13G illustrate spot shapes of light when excitation light of 1 W is emitted.

FIG. 13A illustrates spot shapes of light according to the first embodiment, and entirely uniform spot shapes can be obtained. When light with an energy of 1 W is used as a light source, the maximum energy density on the fluorescent body is 0.84 W/mm$^2$, a burn or the like is prevented from occurring, and fluorescence can be efficiently obtained.

FIG. 13B illustrates spot shapes of light according to the second embodiment, and entirely uniform spot shapes can be obtained. When light with an energy of 1 W is used as a light source, the maximum energy density on the fluorescent body is 0.92 W/mm$^2$, a burn or the like is prevented from occurring, and fluorescence can be efficiently obtained.

FIG. 13C illustrates spot shapes of light according to the third embodiment, and entirely uniform spot shapes can be obtained. When light with an energy of 1 W is used as a light source, the maximum energy density on the fluorescent body is 1.21 W/mm$^2$, a burn or the like is prevented from occurring, and fluorescence can be efficiently obtained.

FIG. 13D illustrates spot shapes of light according to the fourth embodiment, and entirely uniform spot shapes can be obtained. When light with an energy of 1 W is used as a light source, the maximum energy density on the fluorescent body is 1.36 W/mm$^2$, a burn or the like is prevented from occurring, and fluorescence can be efficiently obtained.

FIG. 13E illustrates spot shapes of light according to the fifth embodiment, and entirely uniform spot shapes can be obtained. When light with an energy of 1 W is used as a light source, the maximum energy density on the fluorescent body is 1.49 W/mm$^2$, a burn or the like is prevented from occurring, and fluorescence can be efficiently obtained.

FIG. 13F illustrates spot shapes of light according to a first comparative example, and it is found that spots locally gather at a center portion and the density is high. When light with an energy of 1 W is used as a light source, the maximum energy density on the fluorescent body is 2.0 W/mm$^2$, and a burn likely occurs.

FIG. 13G illustrates spot shapes of light according to a second comparative example, and it is found that spots locally gather at a center portion and the density is high. When light with an energy of 1 W is used as a light source, the maximum energy density on the fluorescent body is 1.75 W/mm$^2$, and a burn likely occurs.

Sixth Embodiment

Figure 14:
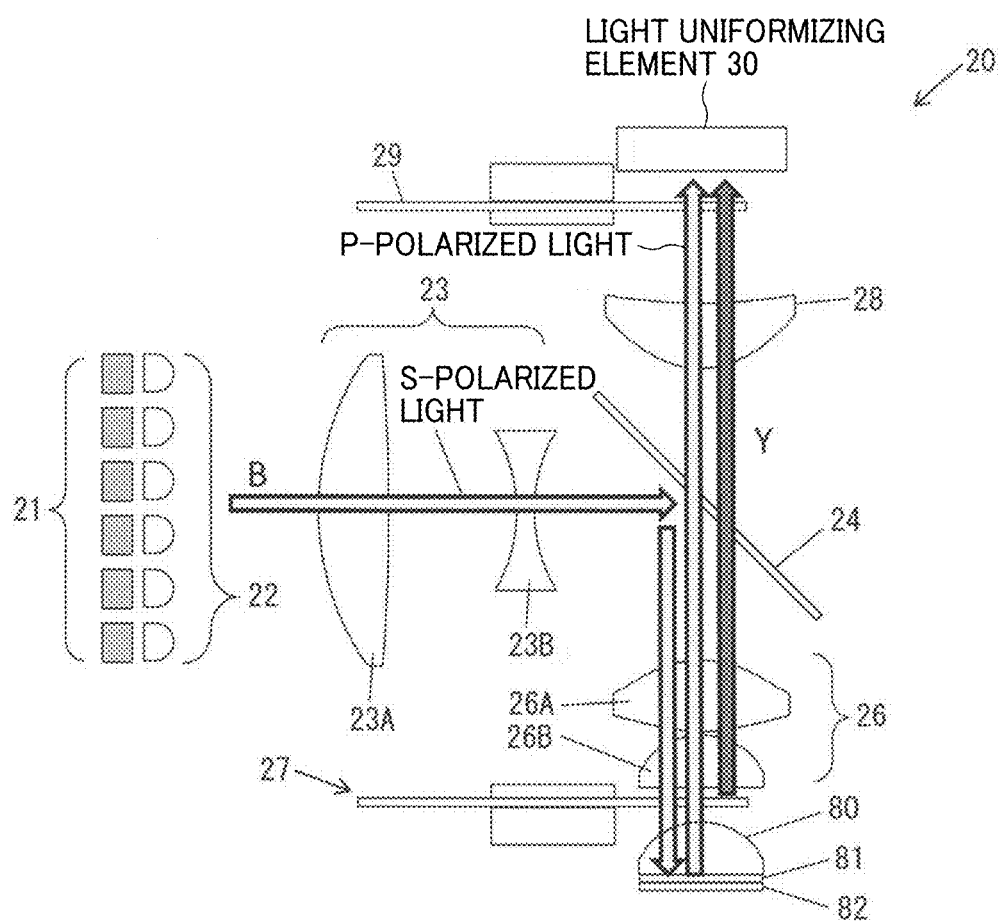
FIG. 14 schematically illustrates a light source device according to a sixth embodiment.

A projector 1 according to a sixth embodiment is described below in detail with reference to FIGS. 14 and 15. The same reference sign is applied to a configuration common to that of the first embodiment, and the redundant description is omitted.

In the sixth embodiment, the ¼ wave plate 25, which is arranged between the polarization beam splitter 24 and the second optical system 26 of the first embodiment, is omitted, and a collimator lens 80, a ¼ wave plate 81, and a reflecting surface 82 are provided on a side opposite to the second optical system 26 with respect to the fluorescent-body wheel 27. In addition, the fluorescent-body wheel 27 has a configuration different from that of the first embodiment.

Figure 15B:
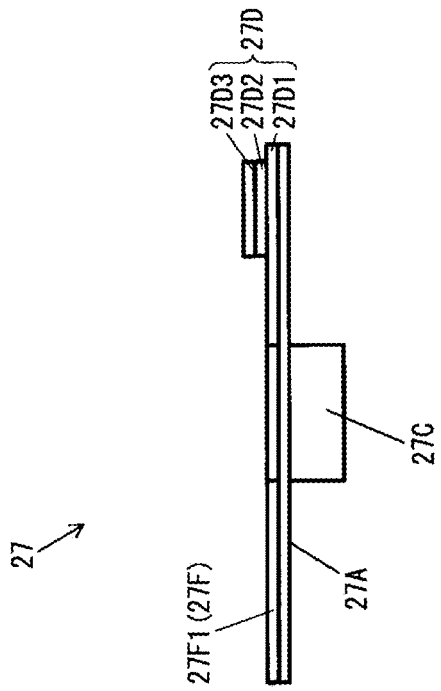
FIGS. 15A and 15B illustrate a specific structure of a fluorescent-body wheel according to the sixth embodiment.
Figure 15A:
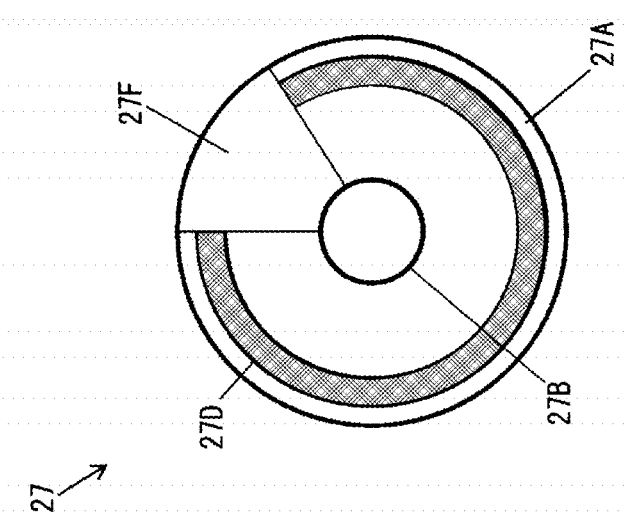

FIGS. 15A and 15B illustrate a specific structure of a fluorescent-body wheel 27 according to the sixth embodiment. The fluorescent-body wheel 27 of the sixth embodiment includes an excitation-light transmissive region 27F instead of the excitation-light reflective region 27E of the first embodiment. The excitation-light transmissive region 27F has a characteristic of transmitting light in a wavelength region of the excitation light B guided from the second optical system 26. The excitation-light transmissive region 27F has an anti-reflection coat (AR coat, transmitting surface) 27F1 that prevents reflection of the excitation light B guided from the second optical system 26.

The excitation light B transmitted through the excitation-light transmissive region 27F of the fluorescent-body wheel 27 is turned into parallel light by the collimator lens 80, is converted into circular polarized light by the ¼ wave plate 81, and is reflected by the reflecting surface 82 to be inverted circular polarized light. Then, the excitation light B is converted into P-polarized light by the ¼ wave plate 81, is transmitted through the collimator lens 80, the second optical system 26, and the polarization beam splitter 24, and is incident on the color wheel 29 through the condenser lens 28.

While the excitation light B is turned into the parallel light by using the collimator lens 80 in the sixth embodiment, a ¼ wave plate with no angle dependence may be used and the collimator lens may be omitted. While the collimator lens 80, the ¼ wave plate 81, and the reflecting surface 82 are optically in contact with one another, the collimator lens 80, the ¼ wave plate 81, and the reflecting surface 82 may be optically separated from one another.

As described in the first embodiment and the sixth embodiment, the fluorescent-body wheel 27 includes a wavelength conversion region (fluorescent region 27D) that converts excitation light B (first color light) into fluorescence Y (second color light), and a transmissive/reflective region (excitation-light reflective region 27E, excitation-light transmissive region 27F) that transmits or reflects excitation light B (first color light). The fluorescent-body wheel 27 can switch light between the excitation light B (first color light) and the fluorescence Y (second color light). Thus, the configuration of the light source device 20 (light source optical system) can be simplified and downsized.

Seventh Embodiment

Figure 16:
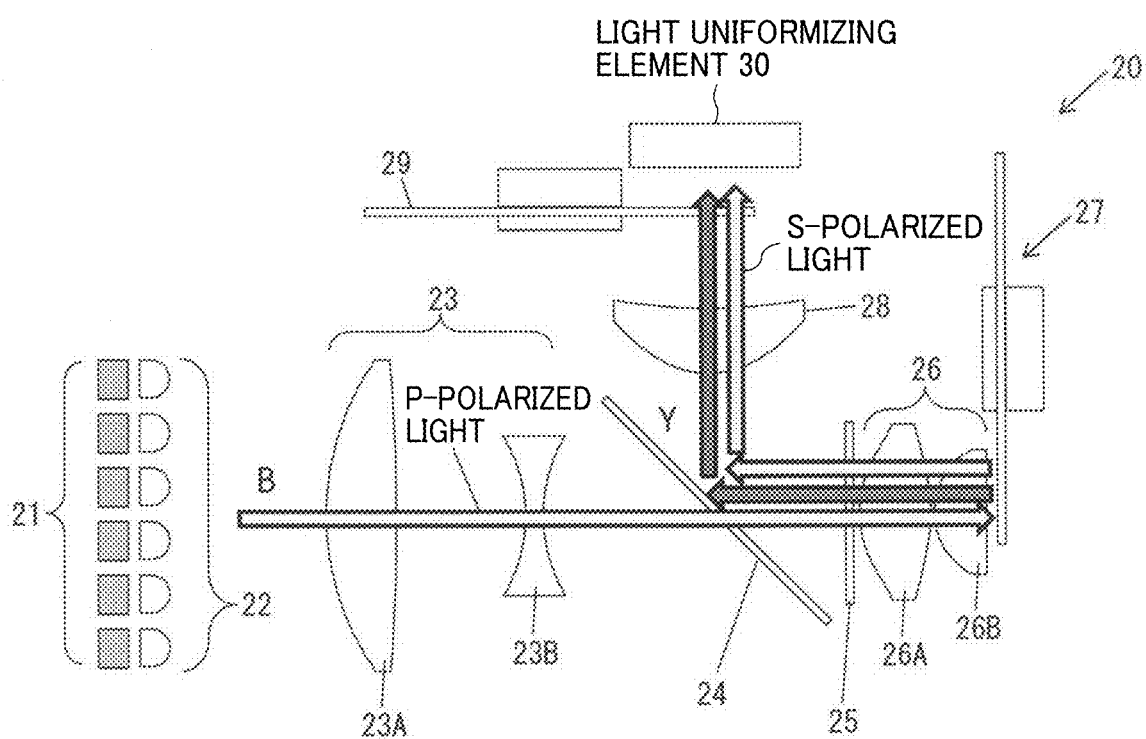
FIG. 16 schematically illustrates a light source device according to a seventh embodiment.

A projector 1 according to a seventh embodiment is described below in detail with reference to FIG. 16. The same reference sign is applied to a configuration common to that of the first embodiment, and the redundant description is omitted.

The seventh embodiment differs from the first embodiment for the following points. In particular, the excitation light B emitted by the laser source 21 is P-polarized light, and the polarization beam splitter 24 has a characteristic of transmitting the excitation light B of P-polarized light guided from the first optical system 23, and reflecting the excitation light B converted into S-polarized light and fluorescence Y from the ¼ wave plate 25, the second optical system 26, and the fluorescent-body wheel 27.

Eighth Embodiment

A projector 1 according to an eighth embodiment is described below in detail with reference to FIGS. 17, 18A, and 18B. The same reference sign is applied to a configuration common to that of the first embodiment, and the redundant description is omitted.

The eighth embodiment differs from the first embodiment in that the condenser lens 28 and the color wheel 29 are omitted and the fluorescent-body wheel 27 has a different configuration.

FIGS. 18A and 18B illustrate a specific structure of a fluorescent-body wheel 27 according to the eighth embodiment. The fluorescent-body wheel 27 of the eighth embodiment is not divided into the fluorescent region 27D and the excitation-light reflective region 27E in the circumferential direction unlike the first embodiment, and a fluorescent region (wavelength conversion region) 27G is provided entirely in the circumferential direction.

The fluorescent region 27G includes a first reflection coat 27G1, a fluorescent-body layer 27G2, and a second reflection coat 27G3 layered in this order from a lower-layer side toward an upper-layer side.

The first reflection coat 27G1 has a characteristic of reflecting light in a wavelength region of the excitation light B guided from the second optical system 26 and light in a wavelength region of fluorescence (emission) by the fluorescent-body layer 27G2.

The fluorescent-body layer 27G2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27G2 may be, for example, the wavelength band of yellow. Thus, by combining yellow with blue of the excitation light, white light can be obtained.

The second reflection coat 27G3 has a characteristic of reflecting a portion of the excitation light B guided from the second optical system 26, and transmitting the other portion of the excitation light B guided from the second optical system 26 and the fluorescence (emission) by the fluorescent-body layer 27G2.

In this case, the fluorescent-body layer 27G2 defines "a wavelength conversion region" that converts excitation light (first color light) B into fluorescence (second color light) Y. The second reflection coat 27G3 defines "a coat layer" that is provided on a side of the incidence surface of the fluorescent-body layer 27G2 (wavelength conversion region) and reflects a portion of the excitation light (first color light) B. Thus, a white light source not using time division can be provided.

The excitation light B reflected by the second reflection coat 27G3 of the fluorescent-body wheel 27 becomes inverted circular polarized light, and passes through the second optical system 26 and the ¼ wave plate 25 again to be converted into P-polarized light. The excitation light B converted into the P-polarized light is transmitted through the polarization beam splitter 24 and is incident on the light uniformizing element 30. In contrast, the excitation light B transmitted through the second reflection coat 27G3 of the fluorescent-body wheel 27 is converted into fluorescence Y by the fluorescent-body layer 27G2 and is reflected by the first reflection coat 27G1. The fluorescence Y is turned into substantially parallel light by the second optical system 26, passes through the ¼ wave plate 25, is transmitted through the polarization beam splitter 24, and is incident on the light uniformizing element 30.

Ninth Embodiment

Figure 19:
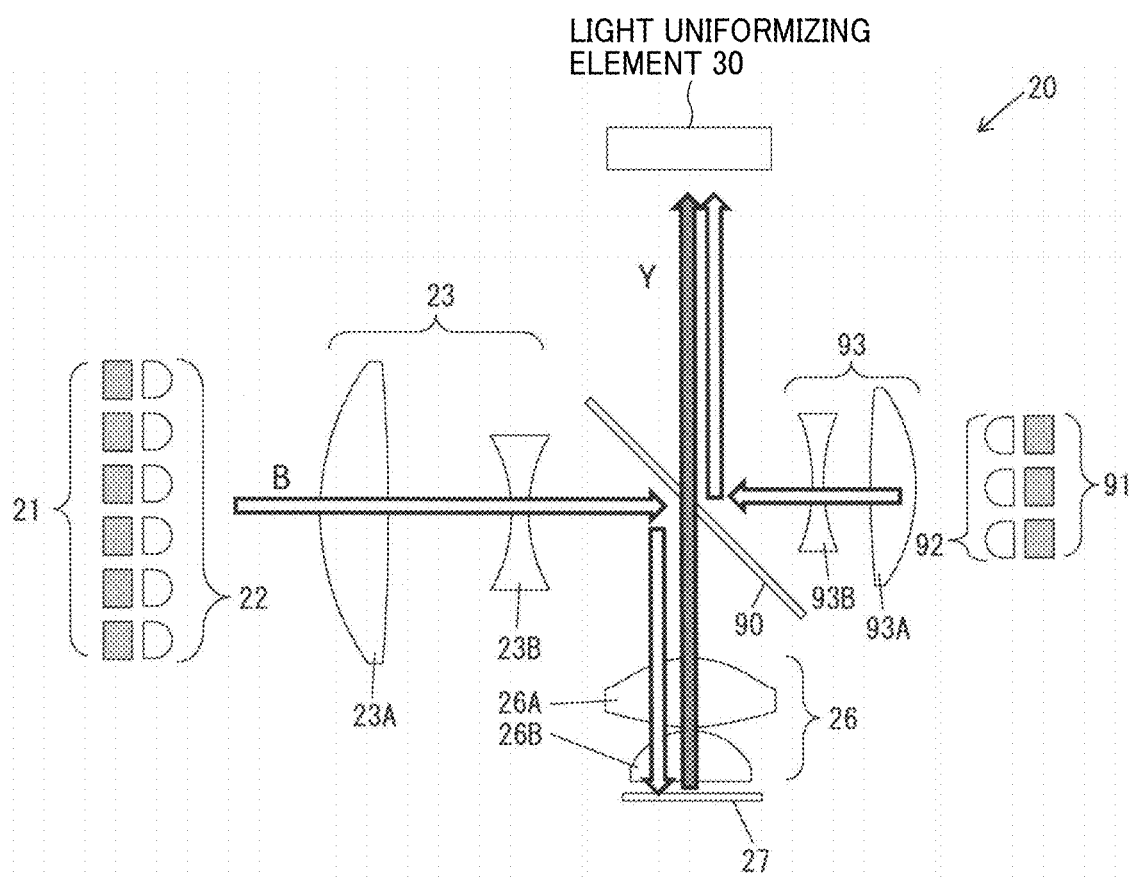
FIG. 19 schematically illustrates a light source device according to a ninth embodiment.

A projector 1 according to a ninth embodiment is described below in detail with reference to FIGS. 19, 20A, and 20B. The same reference sign is applied to a configuration common to that of the first embodiment, and the redundant description is omitted.

The ninth embodiment differs from the first embodiment in that the polarization beam splitter 24, the ¼ wave plate 25, the condenser lens 28, and the color wheel 29 are omitted. Moreover, a dichroic mirror 90 is provided at the position at which the polarization beam splitter 24 is provided in the first embodiment. Furthermore, a blue light source 91, a collimator lens 92, and a third optical system 93 are provided on a side opposite to the first optical system 23 with respect to the dichroic mirror 90.

The blue light source 91 includes a plurality of light sources (solid-state light sources). Each light source of the blue light source 91 emits light (blue laser beam) in a blue wavelength range that differs from the wavelength range of the excitation light B. The collimator lens 92 includes a plurality of collimator lenses to correspond to the plurality of light sources of the blue light source 91. FIG. 19 illustrates three blue light sources 91 and three collimator lenses 92 arranged in the upward and downward directions; however, a subset of three blue light sources 91 and a subset of three collimator lenses 92 may be each arranged in a plurality of lines in the direction orthogonal to the figure surface (depth direction) (or may be two dimensionally arranged). Each collimator lens 92 adjusts the blue laser beam emitted by the corresponding light source of the blue light source 91 to parallel light. The number of blue light sources 91 and the number of collimator lenses 92 can be properly increased or decreased. The third optical system 93 includes a biconvex positive lens 93A and a biconcave negative lens 93B. The third optical system 93 transmits the blue laser beam emitted by the blue light source 91 and the collimator lens 92 and guides the blue laser beam to the dichroic mirror 90. The blue light source 91 may use, for example, a light-emitting diode instead of the laser source.

The dichroic mirror 90 reflects the excitation light B guided from the first optical system 23 to the second optical system 26, and reflects the blue laser beam guided from the third optical system 93 to the light uniformizing element 30. The dichroic mirror 90 transmits the fluorescence from the fluorescent-body wheel 27 to the light uniformizing element 30. The excitation light B reflected by the dichroic mirror 90 is incident on the fluorescent-body wheel 27 through the second optical system 26.

FIGS. 20A and 20B illustrate a specific structure of the fluorescent-body wheel 27 according to the ninth embodiment. The fluorescent-body wheel 27 of the ninth embodiment is not divided into the fluorescent region 27D and the excitation-light reflective region 27E in the circumferential direction unlike the first embodiment, and a fluorescent region (wavelength conversion region) 27H is provided entirely in the circumferential direction.

The fluorescent region 27H includes a reflection coat 27H1, a fluorescent-body layer 27H2, and an anti-reflection coat (AR coat) 27H3 layered in this order from a lower-layer side toward an upper-layer side.

The reflection coat 27H1 has a characteristic of reflecting light in a wavelength region of the fluorescence (emission) by the fluorescent-body layer 27H2. When the disk member 27A is made of a metal substrate with high reflectivity, the reflection coat 27H1 may be omitted (the disk member 27A may have the function of the reflection coat 27H1).

The fluorescent-body layer 27H2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27H2 may provide white light in combination with, for example, the blue laser beam emitted by each light source of the blue light source 91.

The anti-reflection coat 27H3 has a characteristic of preventing reflection of light at the fluorescent-body layer 27H2.

The excitation light B incident on the fluorescent region 27H of the fluorescent-body wheel 27 is converted into fluorescence Y and is emitted. The fluorescence Y is turned into substantially parallel light by the second optical system 26, is transmitted through the dichroic mirror 90, and is incident on the light uniformizing element 30. In contrast, the blue laser beam emitted by each light source of the blue light source 91 is turned into parallel light by the collimator lens 92, passes through the third optical system 93, is reflected by the dichroic mirror 90, and is incident on the light uniformizing element 30.

Tenth Embodiment

Figure 21:
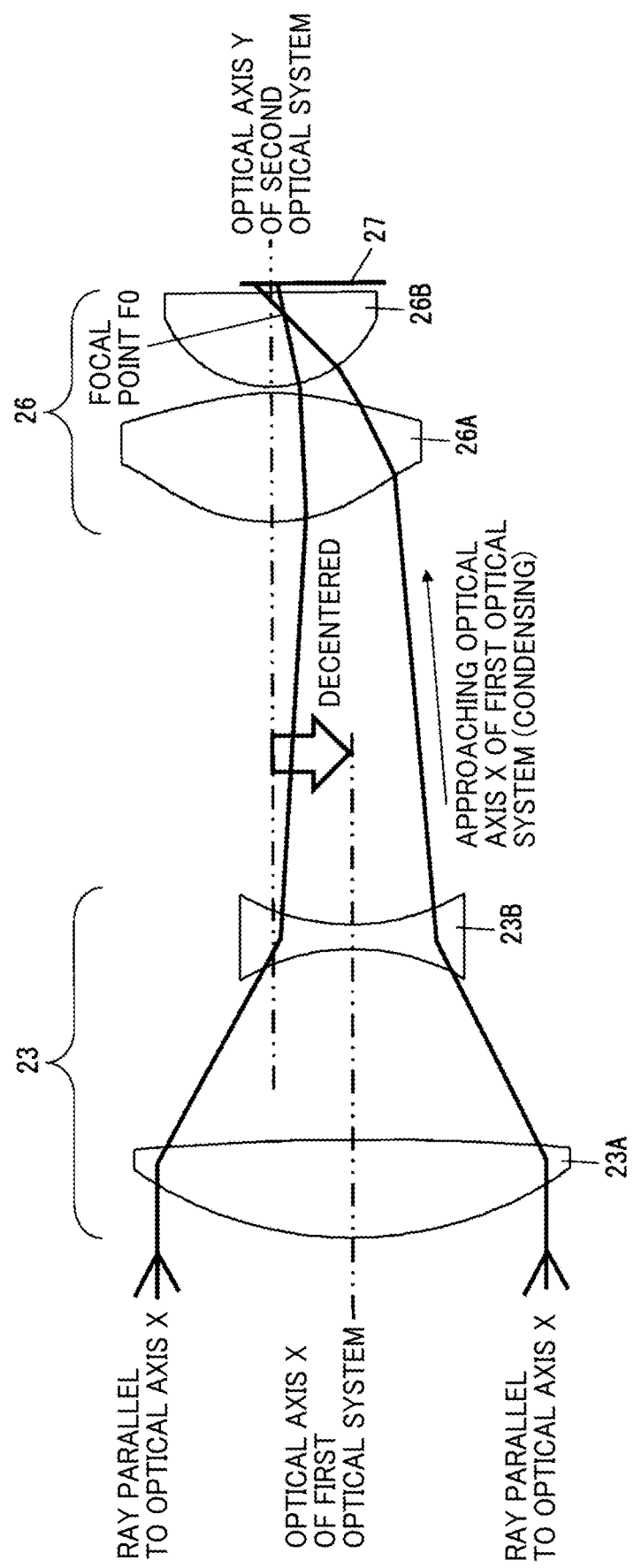
FIG. 21 illustrates an example of rays passing through a first optical system and a second optical system of a light source device according to a tenth embodiment.
Figure 22:
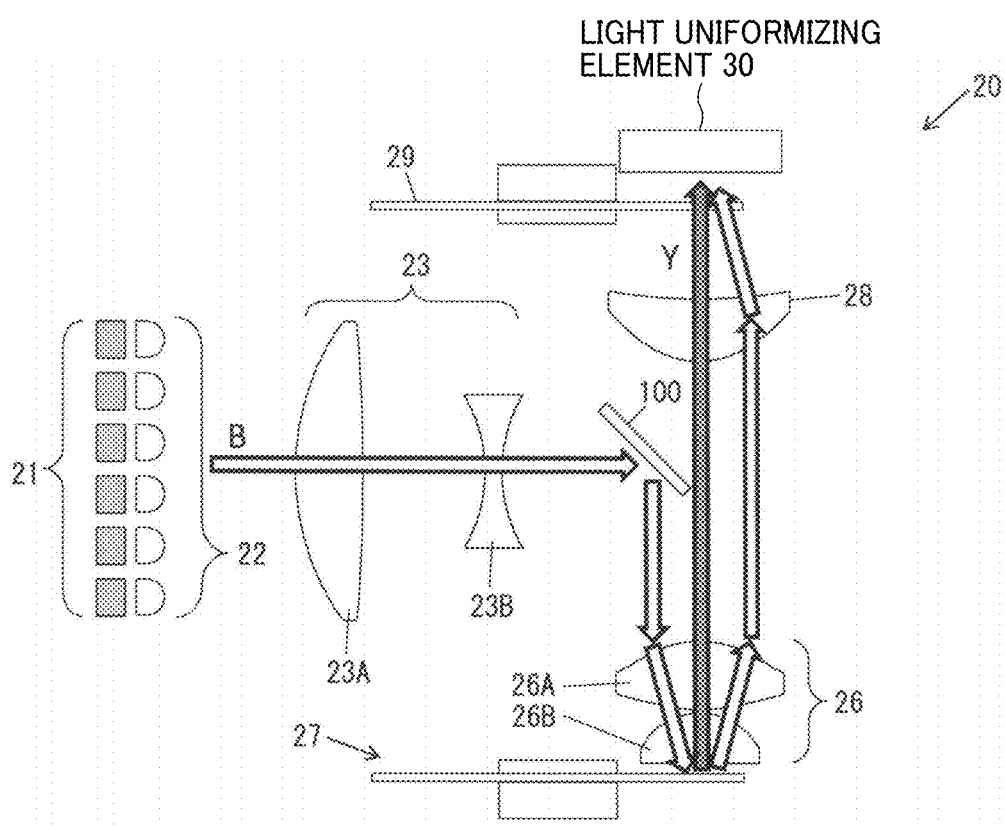
FIG. 22 schematically illustrates the light source device according to the tenth embodiment.

A projector 1 according to a tenth embodiment is described below in detail with reference to FIGS. 21 and 22. The same reference sign is applied to a configuration common to that of the first embodiment, and the redundant description is omitted.

In the tenth embodiment, the ¼ wave plate 25, which is arranged between the polarization beam splitter 24 and the second optical system 26 of the first embodiment, is omitted, and a dichroic mirror 100 is provided at the position at which the polarization beam splitter 24 is provided in the first embodiment. Furthermore, an optical axis X of the first optical system 23 and an optical axis Y of the second optical system 26 are decentered from each other in a direction perpendicular to the optical axes. Thus, excitation light B emitted from the first optical system 23 is incident on one side of the second optical system 26 (a lower side with respect to the optical axis Y in FIG. 21). In the tenth embodiment, light behaves similarly to the first embodiment when the optical axis X of the first optical system 23 is aligned with the optical axis Y of the second optical system 26.

While the polarization direction (S-polarized light, P-polarized light) is determined in the first embodiment, the polarization direction may be any direction in the tenth embodiment. The light emitted by the laser source 21 is turned into parallel light beams by the collimator lenses 22. Then, the parallel light beams pass through the first optical system 23, are reflected by the dichroic mirror 100 that reflects excitation light B and transmits fluorescence Y, and are guided to the second optical system 26. Since the first optical system 23 is arranged to be decentered from the second optical system 26, the excitation light B is incident on one side of the second optical system 26, and is obliquely incident on the fluorescent-body wheel 27. The excitation light B incident on the fluorescent region 27D of the fluorescent-body wheel 27 is converted into fluorescence Y, passes through an optical path similar to that of the first embodiment, and is guided to the light uniformizing element 30.

In contrast, the excitation light B incident on the excitation-light reflective region 27E of the fluorescent-body wheel 27 is regularly reflected. As illustrated in FIG. 22, the excitation light B passes through a side (right side in FIG. 22) opposite to a side (left side in FIG. 22) of the second optical system 26 on which the excitation light B is incident, and is emitted from the second optical system 26. The excitation light B emitted from the second optical system 26 is incident on the condenser lens 28 and is guided to the color wheel 29 and the light uniformizing element 30 without passing through the dichroic mirror 100.

While the excitation light B reflected by the excitation-light reflective region 27E of the fluorescent-body wheel 27 does not pass through the dichroic mirror 100 in the tenth embodiment, another dichroic mirror 100 may be alternatively used, the dichroic mirror 100 being increased in size and having a characteristic that a coat on a half surface reflects the excitation light B and transmits the fluorescence Y and a coat on the other half surface transmits the excitation light B and the fluorescence Y.

Eleventh Embodiment

Figure 23:
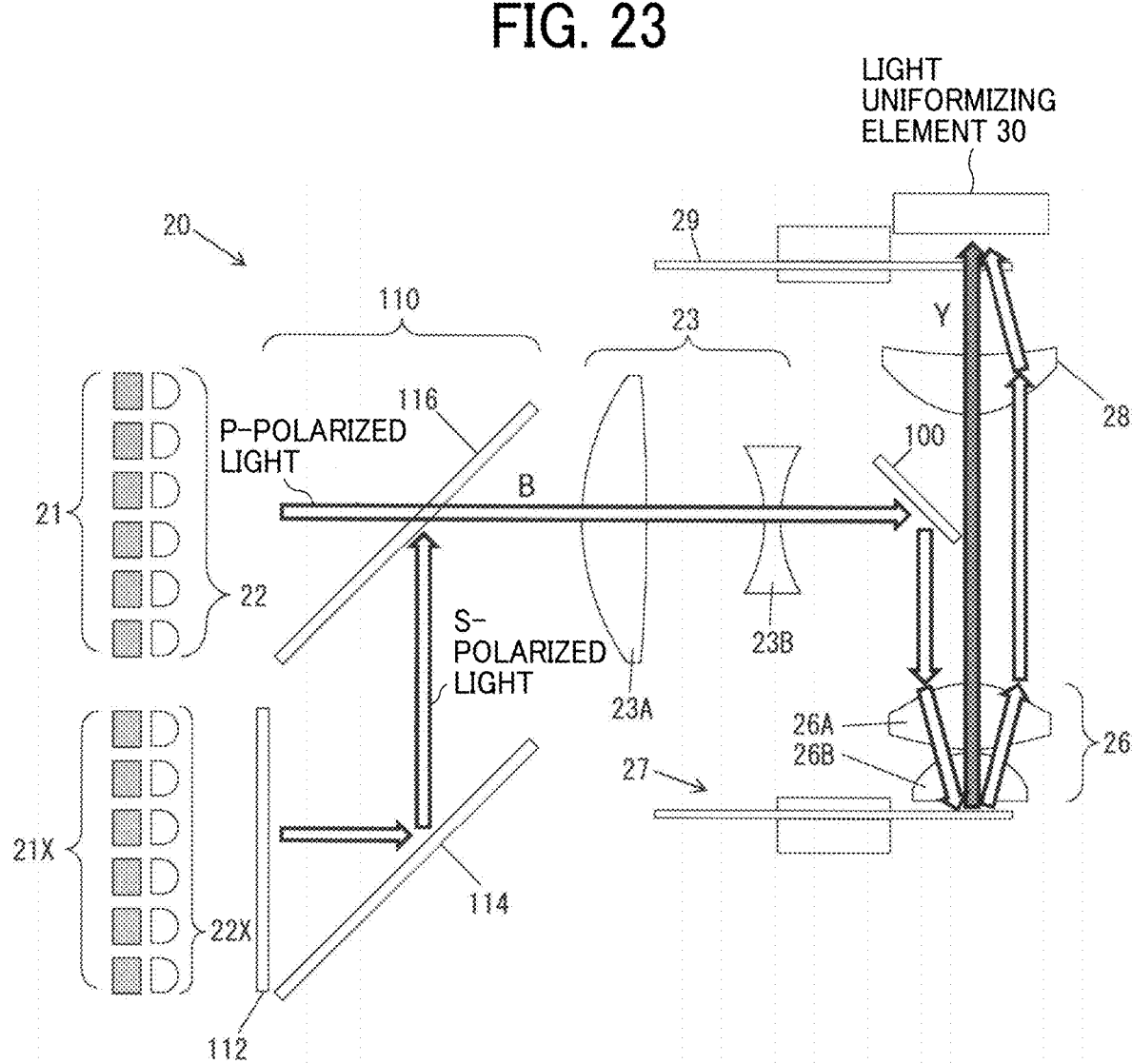
FIG. 23 schematically illustrates a light source device according to an eleventh embodiment.

A projector 1 according to an eleventh embodiment is described below in detail with reference to FIG. 23. The same reference sign is applied to a configuration common to that of the tenth embodiment, and the redundant description is omitted.

The eleventh embodiment includes, in addition to a set of the laser source 21 and the collimator lens 22 in the tenth embodiment, a set of a laser source 21X and a collimator lens 22X located below the set of the laser source 21 and the collimator lens 22. The set of the laser source 21 and the collimator lens 22 and the set of the laser source 21X and the collimator lens 22X emit excitation light B of P-polarized light.

The light source device 20 includes a combining optical system 110 that combines the excitation light B emitted by the set of the laser source 21 and the collimator lens 22 and the excitation light B emitted by the set of the laser source 21X and the collimator lens 22X, and that emits the combined light to the first optical system 23.

The combining optical system 110 includes a ½ wave plate 112, a reflecting mirror 114, and a polarization beam splitter 116.

The ½ wave plate 112 converts the excitation light B emitted from the set of the laser source 21X and the collimator lens 22X, from the P-polarized light into S-polarized light.

The reflecting mirror 114 reflects the excitation light B converted by the ½ wave plate 112 into the S-polarized light toward the polarization beam splitter 116.

The polarization beam splitter 116 has characteristics of reflecting the excitation light B of S-polarized light and transmitting the excitation light B of P-polarized light. The polarization beam splitter 116 transmits the excitation light B of P-polarized light emitted by the set of the laser source 21 and the collimator lens 22 and guides the excitation light B of P-polarized light to the first optical system 23. The polarization beam splitter 116 reflects the excitation light B of S-polarized light reflected by the reflecting mirror 114 and guides the excitation light B of S-polarized light to the first optical system 23. Thus, the excitation light B of P-polarized light and the excitation light B of S-polarized light are combined and incident on the first optical system 23.

The laser source 21 and the laser source 21X are on respective individual substrates. When Smax1 denotes a distance that is between any two emission spots from among emission spots of the laser source 21 and that is the maximum, and Smax2 denotes a distance that is between any two emission spots from among emission spots of the laser source 21X and that is the maximum, a large one of Smax1 and Smax2 may serve as Smax. For example, when the laser source 21 and the laser source 21X use light source arrays equivalent to each other, Smax1=Smax2=Smax is established.

While the set of the laser source 21 and the collimator lens 22 and the set of the laser source 21X and the collimator lens 22X emit the excitation light B of P-polarized light in the above-described example, both the sets may emit excitation light B of S-polarized light. While the polarization beam splitter 116 is used to combine the excitation light B in the above-described example, a comb-shaped mirror may be used to combine excitation light B.

While specific examples desirable for the present disclosure are described in the above-described embodiments; however, the disclosure is not limited to the contents. In particular, the specific shapes and numerical values of the respective components exemplified in the embodiments are merely examples for implementing the disclosure. The technical scope of the disclosure should not be limitedly interpreted thereby. The present disclosure is not limited to the contents described in the embodiments, and may be properly modified within the scope of the disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A light source optical system comprising:
a wavelength converter configured to receive first color light emitted from a excitation light source and emit second color light with a wavelength different from a wavelength of the first color light; and
a first optical system and a second optical system provided in an optical path between the excitation light source and the wavelength converter,
wherein the first optical system includes at least one optical element having a negative power,
wherein the second optical system as a whole has a positive power, and
wherein Conditional Expression (1) is satisfied as follows:

$$1.8 < |Fn/F2| < 5.0, \qquad (1)$$

where
Fn is a focal length for a d-line of the optical element having the negative power of the first optical system, and
F2 is a focal length for the d-line of the second optical system.

2. The light source optical system according to claim 1, wherein the first optical system has an optical characteristic such that, when a ray parallel to an optical axis of the first optical system is incident on the first optical system, a ray emitted from the first optical system is incident on the second optical system while approaching the optical axis.

3. The light source optical system according to claim 1, wherein the first optical system includes at least one optical element having a positive power, and
wherein Conditional Expression (2) is satisfied as follows:

$$1.5 < |Fp/Fn| < 2.4, \qquad (2)$$

where
Fp is a focal length for the d-line of the optical element having the positive power of the first optical system, and
Fn is the focal length for the d-line of the optical element having the negative power of the first optical system.

4. The light source optical system according to claim 1, wherein the excitation light source includes a plurality of emission spots arranged in a two-dimensional array, and
wherein Conditional Expression (3) is satisfied as follows:

$$Smax/DL < 2.0, \qquad (3)$$

where
Smax is a maximum distance between two emission spots from among the plurality of emission spots, and
DL is an outer diameter of an optical element of the second optical system disposed on a side of the first optical system.

5. The light source optical system according to claim 4, wherein the two emission spots that satisfy the Smax are disposed on a single substrate.

6. The light source optical system according to claim 1, wherein the excitation light source includes a plurality of emission spots arranged in a two-dimensional array, and wherein Conditional Expression (4) is satisfied as follows:

$$0.5 < Smax/DLmax < 1.0, \quad (4)$$

where
Smax is a maximum distance between two emission spots from among the plurality of emission spots, and
DLmax is a maximum outer diameter of an optical element included in one of the first optical system and the second optical system.

7. The light source optical system according to claim 1, wherein the excitation light source includes a plurality of emission spots arranged in a two-dimensional array,
wherein the light source optical system further comprises a plurality of collimator lenses corresponding to the plurality of respective emission spots, and
wherein Conditional Expression (5) is satisfied as follows:

$$0.5 < Px/L \cdot \tan \theta x < 2.0, \quad (5)$$

where
θx is, when a direction in which an angle of divergence of each emission point becomes maximum is an X direction, an angle of divergence of each emission spot in the X direction;
Px is, when a direction in which an angle of divergence of each emission spot becomes maximum is an X direction, a pitch of emission spots in the X direction; and
L is a distance between each emission spot and a corresponding one of the collimator lenses.

8. The light source optical system according to claim 1, wherein the wavelength converter includes:
  a wavelength conversion region configured to convert the first color light into the second color light; and
  a transmissive/reflective region configured to transmit or reflect the first color light.

9. The light source optical system according to claim 1, wherein the wavelength converter includes:
  a wavelength conversion region configured to convert the first color light into the second color light; and
  a coat layer provided on a side of an incidence surface of the wavelength conversion region and configured to reflect a portion of the first color light.

10. The light source optical system according to claim 1, further comprising:
  a driving member coupled to the wavelength converter and configured to be driven such that an irradiation position with the first color light on the wavelength converter moves over time.

11. The light source optical system according to claim 1, further comprising:
  a reflecting surface located in an optical path between the excitation light source and the second optical system,
  wherein the reflecting surface reflects one of the first color light and the second color light and transmits the other one of the first color light and the second color light.

12. The light source optical system according to claim 1, wherein Conditional Expression (6) is satisfied as follows:

$$1.6 < Ndave < 1.9, \quad (6)$$

where
Ndave is an average value of refractive indices for the d-line of a plurality of optical elements included in the second optical system.

13. The light source optical system according to claim 1, wherein the first optical system and the second optical system are arranged such that an optical axis of the first optical system and an optical axis of the second optical system are decentered from each other.

14. The light source optical system according to claim 1, wherein an optical element included in the first optical system and an optical element included in the second optical system are lenses.

15. The light source optical system according to claim 1, wherein the first optical system does not transmit 50% or more of the second color light, and the second optical system transmits 50% or more of the second color light.

16. The light source optical system according to claim 1, further comprising:
  a reflecting surface located in the optical path between the excitation light source and the wavelength converter,
  wherein the first optical system is disposed between the excitation light source and the reflecting surface, and
  wherein the second optical system is disposed between the reflecting surface and the wavelength converter.

17. A light source device comprising:
the excitation light source; and
the light source optical system according to claim 1.

18. An image projection apparatus comprising:
the excitation light source;
the light source optical system according to claim 1;
an image display element configured to modulate light from the light source optical system to form an image; and
a projection optical system configured to magnify and project the image onto a projection surface.

\* \* \* \* \*